(12) United States Patent
Owashi et al.

(10) Patent No.: US 8,699,864 B2
(45) Date of Patent: Apr. 15, 2014

(54) METHOD AND APPARATUS FOR RECEIVING A DIGITAL SIGNAL AND APPARATUS FOR RECORDING AND REPRODUCING THE DIGITAL SIGNAL

(75) Inventors: Hitoaki Owashi, Yokohama (JP); Hiroo Okamoto, Yokohama (JP); Kyoichi Hosokawa, Yokohama (JP); Takaharu Noguchi, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 813 days.

(21) Appl. No.: 12/401,182

(22) Filed: Mar. 10, 2009

(65) Prior Publication Data
US 2009/0252478 A1    Oct. 8, 2009

Related U.S. Application Data

(63) Continuation of application No. 10/782,779, filed on Feb. 23, 2004, now Pat. No. 7,844,986, which is a continuation of application No. 09/893,983, filed on Jun. 29, 2001, now Pat. No. 6,757,478, which is a continuation of application No. 09/479,074, filed on Jan. 7, 2000, now Pat. No. 6,321,025, which is a continuation of application No. 08/637,101, filed on Apr. 24, 1996, now Pat. No. 6,163,644.

(30) Foreign Application Priority Data

Apr. 27, 1995  (JP) ...................... 7-103431
Apr. 27, 1995  (JP) ...................... 7-103432

(51) Int. Cl.
*H04N 5/93*  (2006.01)
*H04N 5/85*  (2006.01)

(52) U.S. Cl.
CPC ...................... *H04N 5/85* (2013.01)
USPC ...................................... 386/353

(58) Field of Classification Search
CPC ...................................... H04N 5/85
USPC .............. 386/239, 241, 326, 328–337, 353; 375/240.01–240.29
See application file for complete search history.

(56) References Cited

U.S. PATENT DOCUMENTS 3,773,979 A    11/1973   Kirk, Jr. et al. ............... 348/724
4,499,568 A    2/1985    Gremillet ........................ 369/30
(Continued)

FOREIGN PATENT DOCUMENTS

DE    4201031    7/1993
DE    4335271    5/1994
(Continued)

OTHER PUBLICATIONS

Japanese Office Action dated Feb. 12, 2010, issued in corresponding Japanese Patent Application No. 2009-218410.

(Continued)

*Primary Examiner* — Thai Tran
*Assistant Examiner* — Mishawn Dunn
(74) *Attorney, Agent, or Firm* — Brundidge & Stanger, P.C.

(57) ABSTRACT

A method and apparatus is provided for receiving and/or reproducing a digital signal, capable of efficiently recording a compressed, packeted digital signal and inhibiting a copy thereof. An input packet signal is added with a time stamp indicating a relative time of an arrival of the packet, and the packet signals of digital information with the added time stamps are recorded at reduced intervals therebetween. In reproducing, a packet interval adjusting circuit restores the original packet intervals in accordance with the time stamps, and then a time stamp change circuit changes at least one bit of the time stamp and thereafter outputs the digital information.

2 Claims, 13 Drawing Sheets

(56) References Cited

U.S. PATENT DOCUMENTS

| | | | | |
|---|---|---|---|---|
| 4,530,054 A * | 7/1985 | Hamstra et al. | ............... | 711/133 |
| 4,591,924 A | 5/1986 | Miura et al. | ............... | 358/330 |
| 4,631,603 A | 12/1986 | Ryan | ............... | 360/37.1 |
| 4,694,490 A | 9/1987 | Harvey | ............... | 380/20 |
| 4,704,725 A | 11/1987 | Harvey | ............... | 380/9 |
| 4,706,121 A | 11/1987 | Young | ............... | 358/142 |
| 4,751,578 A | 6/1988 | Reiter et al. | ............... | 358/183 |
| 4,807,055 A | 2/1989 | Tsunoda et al. | ............... | 386/104 |
| 4,908,713 A | 3/1990 | Levine | ............... | 358/335 |
| 4,945,563 A | 7/1990 | Horton et al. | ............... | 380/5 |
| 4,963,994 A | 10/1990 | Levine | ............... | 358/335 |
| 4,965,825 A | 10/1990 | Harvey | ............... | 380/9 |
| 4,977,455 A | 12/1990 | Young | ............... | 358/142 |
| 4,991,208 A | 2/1991 | Walker et al. | ............... | 380/20 |
| 5,038,211 A | 8/1991 | Hallenback | ............... | 358/142 |
| 5,046,092 A | 9/1991 | Walker et al. | ............... | 380/20 |
| 5,065,259 A | 11/1991 | Kubota et al. | ............... | 386/7 |
| 5,109,414 A | 4/1992 | Harvey | ............... | 380/9 |
| 5,134,496 A | 7/1992 | Schwab et al. | ............... | 380/5 X |
| 5,151,789 A | 9/1992 | Young | ............... | 358/194.1 |
| 5,224,087 A | 6/1993 | Maeda et al. | ............... | 369/54 |
| 5,233,654 A | 8/1993 | Harvey | ............... | 380/20 |
| 5,289,288 A | 2/1994 | Silverman et al. | ............... | 386/97 |
| 5,293,357 A | 3/1994 | Hallenback | ............... | 348/734 |
| 5,313,342 A | 5/1994 | Soda et al. | ............... | 360/63 |
| 5,319,501 A | 6/1994 | Mitsuhashi | ............... | 386/101 |
| 5,359,428 A | 10/1994 | Kubata et al. | ............... | 386/33 |
| 5,377,051 A | 12/1994 | Lane et al. | ............... | 386/68 |
| 5,418,853 A | 5/1995 | Kanota et al. | ............... | 380/5 |
| 5,432,646 A | 7/1995 | Nakamura et al. | ............... | 386/104 |
| 5,438,463 A | 8/1995 | Nishiumi et al. | ............... | 386/96 |
| 5,442,390 A | 8/1995 | Hooper et al. | ............... | 358/86 |
| 5,448,568 A | 9/1995 | Delpuch et al. | ............... | 348/423.1 |
| 5,467,342 A | 11/1995 | Logston et al. | ............... | 370/17 |
| 5,477,396 A | 12/1995 | Fukami et al. | ............... | 360/10.3 |
| 5,479,268 A | 12/1995 | Young et al. | ............... | 358/335 |
| 5,488,409 A | 1/1996 | Yuen et al. | ............... | 386/83 |
| 5,497,420 A | 3/1996 | Garneau | ............... | 380/20 |
| 5,502,497 A | 3/1996 | Yamaashi et al. | ............... | 348/473 |
| 5,502,573 A | 3/1996 | Fujinami | ............... | 386/98 |
| 5,508,815 A | 4/1996 | Levine | ............... | 358/335 |
| 5,519,544 A | 5/1996 | Hara | ............... | 386/96 |
| 5,526,127 A | 6/1996 | Yonetani et al. | ............... | 386/83 |
| 5,526,130 A | 6/1996 | Kim | ............... | 360/69 |
| 5,535,216 A | 7/1996 | Goldman et al. | ............... | 348/423 |
| 5,537,408 A | 7/1996 | Branstad et al. | ............... | 370/79 |
| 5,541,738 A | 7/1996 | Mankovitz | ............... | 386/83 |
| 5,548,410 A | 8/1996 | Kim et al. | ............... | 386/104 |
| 5,555,308 A | 9/1996 | Levien | ............... | 380/20 |
| 5,555,441 A | 9/1996 | Haddad | ............... | 725/93 |
| 5,565,924 A | 10/1996 | Haskell et al. | ............... | 348/423 |
| 5,566,174 A | 10/1996 | Sato et al. | ............... | 348/423 |
| 5,568,272 A | 10/1996 | Levine | ............... | 386/48 |
| 5,568,403 A | 10/1996 | Deiss et al. | ............... | 364/514 |
| 5,572,331 A | 11/1996 | Yu | ............... | 386/96 |
| 5,572,333 A | 11/1996 | Moriyama et al. | ............... | 386/98 |
| 5,583,652 A * | 12/1996 | Ware | ............... | 386/206 |
| 5,596,581 A | 1/1997 | Saeijis et al. | ............... | 386/104 |
| 5,617,145 A * | 4/1997 | Huang et al. | ............... | 348/423.1 |
| 5,619,337 A | 4/1997 | Naimpally | ............... | 386/83 |
| 5,619,570 A | 4/1997 | Tsutsui | | |
| 5,668,915 A | 9/1997 | Baik et al. | ............... | 386/46 |
| 5,671,095 A | 9/1997 | Arai et al. | ............... | 360/8 |
| 5,686,954 A | 11/1997 | Yoshinobu et al. | | |
| 5,719,943 A | 2/1998 | Amada et al. | ............... | 380/49 |
| 5,727,060 A | 3/1998 | Young | ............... | 348/734 |
| 5,815,634 A | 9/1998 | Daum et al. | ............... | 386/96 |
| 5,878,010 A | 3/1999 | Oakamoto et al. | ............... | 369/59 |
| 5,878,188 A | 3/1999 | Amanda et al. | ............... | 386/101 |
| 5,903,704 A | 5/1999 | Owashi et al. | ............... | 386/95 |
| 5,905,844 A | 5/1999 | Kimura et al. | ............... | 386/83 |
| 5,930,449 A | 7/1999 | Hwang | ............... | 386/83 |
| 6,041,161 A | 3/2000 | Oakamoto et al. | ............... | 386/112 |
| 6,115,537 A * | 9/2000 | Yamada et al. | ............... | 386/241 |
| 6,163,644 A | 12/2000 | Owashi et al. | ............... | 386/46 |
| 6,321,025 B1 | 11/2001 | Owashi et al. | ............... | 386/83 |

FOREIGN PATENT DOCUMENTS

| | | |
|---|---|---|
| EP | 0338866 | 10/1989 |
| EP | 0450841 | 10/1991 |
| EP | 0489375 | 6/1992 |
| EP | 0506435 | 9/1992 |
| EP | 0565305 | 4/1993 |
| EP | 0602897 | 12/1993 |
| EP | 0577329 | 1/1994 |
| EP | 0589459 | 3/1994 |
| EP | 0624983 | 5/1994 |
| EP | 0606180 | 7/1994 |
| EP | 06188695 | 10/1994 |
| EP | 0632445 | 1/1995 |
| EP | 0648050 | 4/1995 |
| EP | 0661876 | 7/1995 |
| EP | 0668697 | 8/1995 |
| EP | 0710021 | 5/1996 |
| GB | 2286751 | 8/1995 |
| JP | 63220684 | 9/1988 |
| JP | 1209399 | 8/1989 |
| JP | 1307944 | 12/1989 |
| JP | 02041091 | 2/1990 |
| JP | 02054320 | 2/1990 |
| JP | 4360068 | 12/1992 |
| JP | 5174496 | 7/1993 |
| JP | 05207387 | 8/1993 |
| JP | 5207507 | 8/1993 |
| JP | 05274844 | 10/1993 |
| JP | 05328322 | 12/1993 |
| JP | 06131371 | 5/1994 |
| JP | 06208760 | 7/1994 |
| JP | 06267010 | 9/1994 |
| JP | 06303543 | 10/1994 |
| JP | 06311479 | 11/1994 |
| JP | 07007684 | 1/1995 |
| JP | 07107448 | 4/1995 |
| JP | 8102922 | 4/1996 |
| JP | 4219613 | 2/2009 |
| WO | 9102419 | 2/1991 |
| WO | 9418776 | 8/1994 |
| WO | 9527977 | 10/1995 |
| WO | 9604753 | 2/1996 |

OTHER PUBLICATIONS

Japanese Office Action dated Apr. 6, 2010, issued in corresponding Japanese Patent Application No. 2009-218410.

Japanese Office Action issued on Jul. 21, 2009 in corresponding Japanese Patent Application No. 2009-018971.

Japanese Final Rejection issued on Oct. 27, 2009 in corresponding Japanese Patent Application No. 2009-018971.

"Data Compression and Digital Modulation", Nikkei BP, pp. 137-150.

Transactions The Institute of Television Engineers of Japan, vol. 46, No. 1, pp. 31-39, 1992.

Little, et al "A Digital on-Demand Video Service Supporting Content-Based Queries", ACM Multimedia 93, pp. 427-436, Jul. 1993.

Chao, "Asynchronous Transfer Mode Packet Video Transmission System", Optical Engineering, vol. 28, No. 7, Jul. 1989, pp. 781-788.

Riemann, "DER MPEG-2-Standard", vol. 48, No. 10, Oct. 1994, pp. 545-550.

International Organization for Standardization Organization Internationale De Normalization ISO/IEC/JTC/SC29/WG11 coding of Moving Pictures and Associated Audio, Mar. 1992, pp. 35-39.

Patent Abstract Japan, vol. 145, No. 66 (P-1003), Feb. 7, 1990 & KP 01 287857 A (Victor Company of Japan), Nov. 20, 1989 Abstact.

Patent Abstract of Japan, vol. 12, No. 486 (E-695), Dec. 19, 1988 & JP 63 202286 A (Matsushita Electric Industrial) Aug. 22, 1988.

(56) References Cited

OTHER PUBLICATIONS

Notification of European Publication No. and Information on the Application of Article 67(3) EPC and European Search Report Jan. 15, 1999.
Grand Alliance HDTV System Specification (Draft Document) submitted to the ACATS Technical Subgroup dated Feb. 22, 1994.
M. Harada, "5-3 Future View of CATV", Journal of the Institute of Television Engineers of Japan, vol. 47, No. 4, 1993, pp. 494-499.
T. Kimura, et al "Conditional Access Systems for Digital Broadcasting", NHK Science and Technical Research Laboratories, The Institute of Electronics Information and Communication Engineers Technical Report of IEICE, Dec. 16, 1994, vol. 94, No. 411, pp. 49-56.
T. Yoshimura, et al "Special Issue, 3-4 MPEG Systems" in "Image Information Engineering and Broadcasting Technology", Journal of Institute of Television Engineers of Japan, vol. 49, No. 4, pp. 480-489, Apr. 20, 1995.

* cited by examiner

FIG. 7

| (1) | V1 | V2 | A1 | V3 | PG | V/ECM | V4 | A2 | A/ECM | V1 | A3 | A4 | |
| (2) | V4 | A2 | V1 | V3 | A1 | V1 | V4 | V2 | A4 | V3 | V4 | | |
| (3) | A2 | PG | V2 | V4 | V1 | V/ECM | V1 | V2 | A3 | V2 | A/ECM | A4 | A1 |

...

| (n) | V1 | V2 | A1 | V/ECM | A/ECM | PG | V1 | V4 | V3 | A2 | V1 | A3 | A4 | |

METHOD AND APPARATUS FOR RECEIVING A DIGITAL SIGNAL AND APPARATUS FOR RECORDING AND REPRODUCING THE DIGITAL SIGNAL

The present application claims priority from Japanese Patent Application No. 07-103431, filed Apr. 27, 1995 and Japanese Patent Application No. 07-103432, filed Apr. 27, 1995 and is a continuation of application Ser. No. 10/782,779, filed Feb. 23, 2004 now U.S. Pat. No. 7,844,986; which is a continuation of application Ser. No. 09/893,983 filed Jun. 29, 2001, now U.S. Pat. No. 6,757,478; which is a continuation of application Ser. No. 09/479,074, filed Jan. 7, 2000, now U.S. Pat. No. 6,321,025; which is a continuation of application Ser. No. 08/637,101, filed Apr. 24, 1996 now U.S. Pat. No. 6,163,644, the contents of which are incorporated herein by reference.

BACKGROUND OF THE INVENTION

The present invention relates to a method and apparatus for receiving and/or reproducing digital signals of movies, programs, and the like transmitted via transmission media such as coaxial cables, telephone lines, and broadcast satellites. More particularly, the invention relates to such a method and apparatus capable of constraining a copy of a recorded digital signal.

DESCRIPTION OF THE RELATED ART

A method of inhibiting a copy of a video signal with a recording/reproducing apparatus is disclosed, for example, in JP-A-61-288582. The technique described in this JP-A-061-288582 adds a signal immediately after a synchronization signal of a video signal so that although a television can display this video signal, a video tape recorder (VTR) can record only an image of poor quality. Another JP-A-4-360068 discloses techniques of restricting a user to copy data or inhibiting a user to see an image of data, with a data recording/reproducing apparatus.

As a method of comprising digital video signals at a high efficiency, the ITU-T Draft Rec. H. 262 standard called MPEG-2 (Moving Picture Experts Group) is known. MPEG-2 Systems Working Draft is also known which is the transmission standard of video and audio signals compressed by MPEG-2.

The above standards show the techniques of compressing a program and broadcasting it in a digital format. This compression method realizes a large compression rate so that a single transmission channel can broadcast programs four to eight times as many as a conventional analog broadcast. With this technique, services called near video-on-demand are already available in which the same 2-hour movie is repetitively broadcast at an interval of 30 minutes. However, it is impossible to broadcast all programs 24 hours for near video-on-demand. Therefore, subscribers have a great need for recording a program and reproducing it at a desired time to watch it.

In recording/reproducing a digitally compressed and broadcast program, it can be considered that a received digital signal is decompressed and converted into an analog signal to record it with a conventional analog VTR. However, an analog signal recorded in the analog VTR loses a good signal-to-noise (S/N) ratio of digital signals.

It is therefore desired to digitally record a digital broadcast signal. However, no technique is disclosed as yet to record a digital signal compressed and broadcast, for example, in conformity with the MPEG standard. Generally, error correction is performed to a sufficient degree during recording/reproducing digital signals so that even if copies are made repetitively, the image quality is not lowered. However, on the other hand, it is difficult to protect the rights of a copyright holder if a copy without image quality degradation is permitted. Techniques for protecting the rights of a copyright holder are disclosed in the above cited JP-A-61-288582 for conventional analog VTRs. The other JP-A-4-360068 discloses techniques for restricting a user to copy data or inhibiting a user to see an image of data, with a data recording/reproducing apparatus.

However, techniques of recording digital signals compressed and transmitted in conformity with the MPEG standard and restricting copies of recorded digital signals are not shown at all in the above documents.

Although it is desired to directly record a digital broadcast signal itself, the technique of recording digital signals compressed and transmitted in conformity with the MPEG standard is not disclosed as yet. Generally, error correction is performed to a sufficient degree during recording/reproducing digital signals so that it is advantageous in that the same tape can be repetitively viewed without any image quality degradation. However, on the other hand, if the same tape is allowed to be repetitively viewed without any image quality degradation, a video tape like a cell video tape (a commercial video cassette tape of movies or the like) can be formed easily so that protection of the rights of a copyright holder is difficult. JP-A-61-288582 discloses the technique of protecting the rights of a copyright holder for conventional analog VTRs. JP-A-4-360068 discloses the technique of restricting a user to copy data or inhibiting a user to see an image of data, with a data recording/reproducing apparatus.

However, techniques of recording digital signals compressed and transmitted in conformity with the MPEG standard and restricting copies of recorded digital signals are not shown at all.

SUMMARY OF THE INVENTION

It is an object of the present invention to provide a method and apparatus for efficiently recording a signal compressed and broadcast, for example, in conformity with the MPEG standard, and constraining copies of such signals.

It is another object of the present invention to provide a method and apparatus for efficiently recording a signal compressed and broadcast, for example, in conformity with the MPEG standard, and constraining reproduction of such signals.

According to one aspect of the invention achieving the above objects, there is provided a method of recording/reproducing a digital signal in which each of a plurality of programs is bit-compressed; the bit-compressed program is encrypted; the encrypted programs are time divisionally multiplexed; the time divisionally multiplexed programs are modulated with a single carrier; the modulated signal is transmitted; the transmitted signal is received; the received signal is demodulated; at least one program in a packet format is selected from the demodulated signal; the selected program in a packet format is decrypted; a packet signal added with time information indicating an arrival time of each packet included in the decrypted signal in a packet format is inputted, and the packet signal with the time information is recorded, the method comprising the steps of: reproducing the recorded packet signal with the time information; and changing at least one bit of information bits of the time stamp contained in the reproduced packet signal, and outputting digital information with the changed time stamp.

In operation of this method, packet signals with time information are inputted to the recording/reproducing apparatus and recorded at packed intervals in order to improve a recording efficiency. In reproducing packet signals, packet intervals are changed to the original intervals in accordance with detected time information added to the packet signals and thereafter output from the recording/reproducing apparatus. Since packet signals are recorded after packing the intervals therebetween, it is possible to record them at a signal rate slower than the input signal, allowing efficient recording. By using the time information added to the packet signal, packet signals can be changed to have the original packet intervals, and thereafter they are reproduced. If at least one bit of the added time information is changed for the reproduction and reproduced signals are supplied to, and recorded with, another recording/reproducing apparatus, the original intervals between these signals cannot be restored because the added time information is different from the original time information. Accordingly, these signals cannot be decompressed and restored.

According to another aspect of the invention achieving the above objects, there is provided a system in which a plurality of bit-compressed channel programs and their guide information including at least information of a date and time of program reception are transmitted and received, a program is selected from the plurality of received programs, the selected program is recorded and reproduced with a recording/reproducing apparatus, the reproduced program is bit-decompressed to restore and display an original program, the system comprising: means for forming new guide information by selecting guide information and information of date and time of the selected program from the plurality of received programs; means for outputting the selected program and the new guide information to the recording/reproducing apparatus at the same time; means for setting a current time by using information of date and time contained in the guide information of the plurality of received programs; means for comparing the current time with the information of the time and data contained in the reproduced new guide information; and means for inhibiting bit expansion of the reproduced program if the comparison result indicates that a predetermined period has lapsed.

According to the structure of this system, the current time can be correctly and reliably set from the guide information of the plurality of received programs. Since the current time is set from the received information, it cannot be changed by a subscriber. Furthermore, new guide information is formed from received guide information when the selected program is recorded, and the new guide information contains information of date and time of program reception. Therefore, a lapse time from the program reception can be known correctly and reliably by comparing the program reception date and time with the current date and time. If the lapse time exceeds the predetermined time, bit expansion is inhibited to restrict reproduction of a recorded tape.

Other objects, features and advantages of the present invention will become apparent from the following description of embodiments of the invention taken in conjunction with the accompanying drawings.

BRIEF DESCRIPTION OF THE DRAWINGS

FIG. 7 shows signal waveforms according to the invention.

DESCRIPTION OF THE PREFERRED EMBODIMENTS

Figure 1:
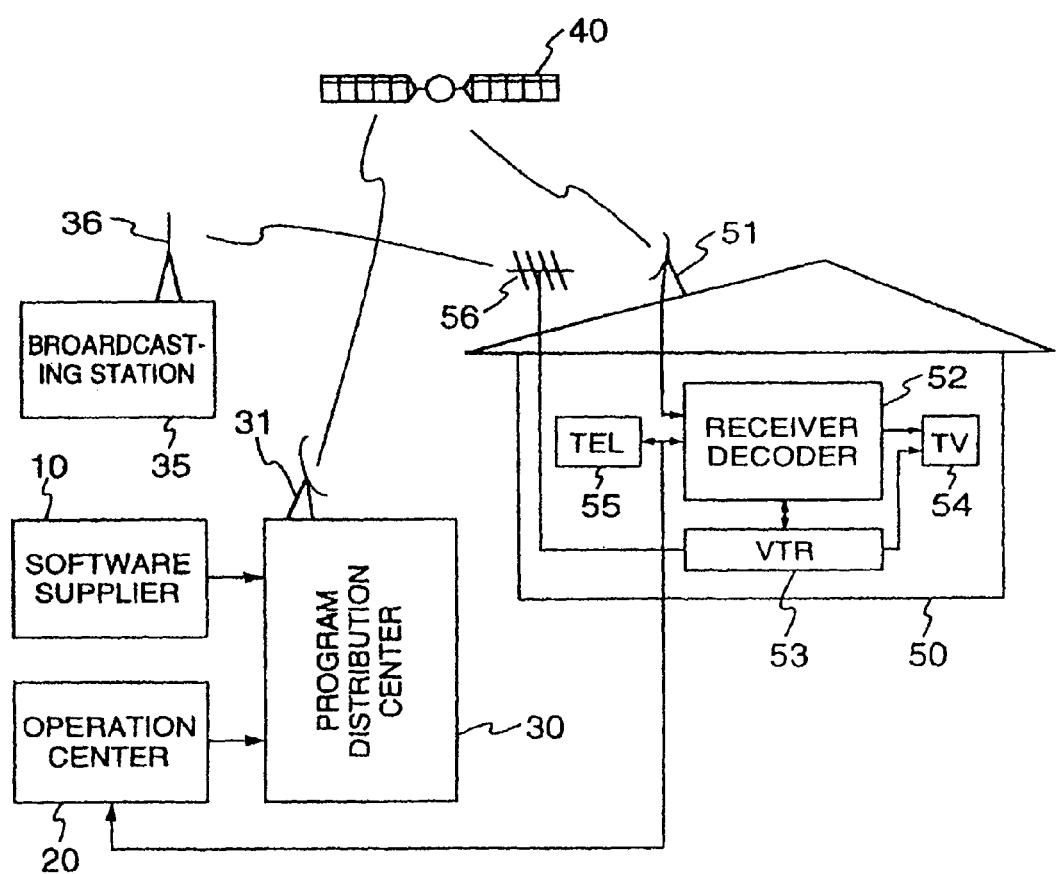
FIG. 1 is a block diagram showing a digital broadcast system and an analog broadcast system to which the invention is applied.

A video distribution service using a satellite according to an embodiment of the invention will be described with reference to FIG. 1. In FIG. 1, a reference numeral 10 designates a software supplier, numeral 20 an operation center, numeral 30 a program distribution center, numeral 31 a transmitter, numeral 35 a current broadcasting station, numeral 36 a transmitter, numeral 40 an artificial satellite for distributing signals, numeral 50 a subscriber household, numeral 51 a receiver, numeral 52 a receiver decoder, numeral 53 a VTR, numeral 54 a TV receiver, numeral 55 a telephone set, and numeral 56 a receiver.

The video distribution service is carried out by an operator managing the operation center 20. The operator signs a contract with the software supplier 10 and causes the required software to be supplied from the software supplier 10 to the program distribution center 30. According to the embodiment shown in FIG. 1, only one supplier 10 is shown. Normally, however, a plurality of software suppliers are engaged in supplying software.

The program distribution center 30 transmits a radio wave toward the satellite 40 by means of the transmitter 31 installed in the center 30. The satellite 40 receives the radio wave and retransmits it toward the subscriber 50. The radio wave thus transmitted is received by the receiver 51. According to the embodiment shown in FIG. 1, only one subscriber 50 is shown. Actually, however, a plurality of subscribers exist.

The radio wave received by the receiver 51 is applied to the receiver decoder 52, and the software of a predetermined channel is selected by the receiver decoder 52. The software thus selected is recorded in the VTR 53 as required. The signal recorded in the VTR 53 and reproduced at the desired time is returned to the receiver decoder 52, restored into the original video signal, and applied to the TV receiver 54. In the case where the subscriber desires to watch the program without recording, the original video signal is restored without the VTR 53 and applied to the TV receiver 54.

The subscriber may request a desired software from the operation center 20 by way of the telephone 55. Also, the operation center 20 can survey the receiving and viewing conditions of the subscriber 50 through the telephone channel from the receiver decoder 52 and charge the subscriber 50 in accordance with the viewing conditions.

Further, the radio wave transmitted from the current broadcast station 35 by the transmitter 36 is received by the receiver 56 and the received signal is input and recorded in the VTR 53. The signal reproduced in the VTR 53 may be applied to the TV receiver 54 to view the program. In the case where the VTR 53 is not required to record the program, the signal from the receiver 56 is of course applied to the TV receiver 54 and the program can be viewed directly.

Figure 2:
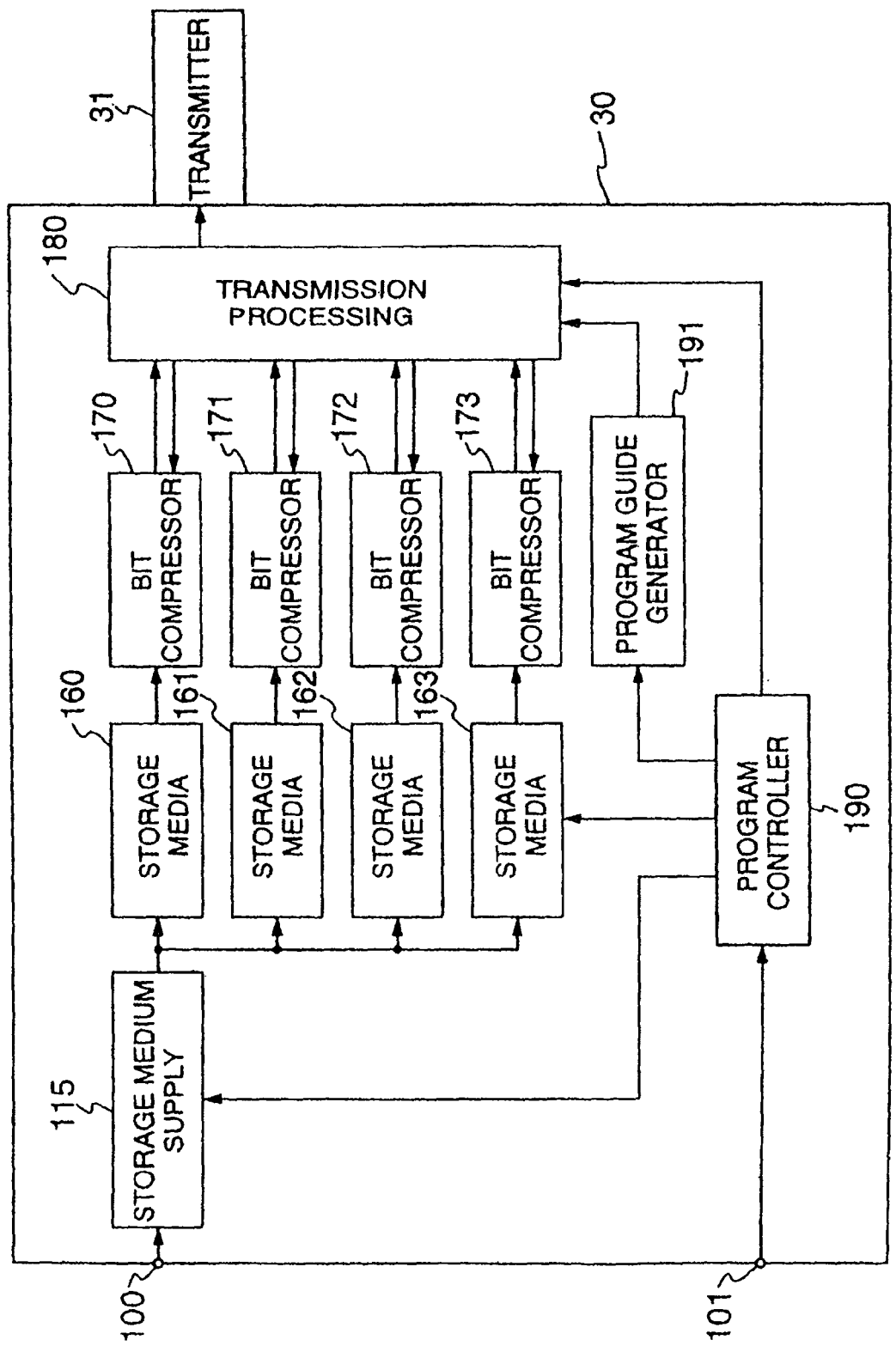
FIG. 2 is a block diagram showing a program distribution center according to an embodiment of the invention.

FIG. 2 is a block diagram showing the program distribution center 30 according to an embodiment in detail. In FIG. 2, numeral 100 designates input means for software sent from the software supplier 10, numeral 101 input means for a control signal for the program or the like sent from the operation center 20, numeral 115 a supply unit for a storage medium, numerals 160 to 163 storage media, numerals 170 to 173 bit compressors, numeral 180 a transmission processing device, numeral 190 a program controller, and numeral 191 a program guide generator.

The embodiment shown in FIG. 2 represents the case in which software is sent from the software supplier 10 in a storage medium. In this case, the terminal 100 acts only as a window for receiving the storage medium by the program distribution center 30. The storage medium thus received is stored in a storage medium supply unit 115 and is supplied to the storage media 160 to 163 under the control of the program controller 190. The signals reproduced at the storage media 160 to 163 are applied respectively to the bit compressors 170 to 173, where they are bit-compressed according to the MPEG-2 standard or the like. The output signal of the compressors 170 to 173 is applied to the transmission processing device 180.

Also, a control signal for the program issued or the like is applied from the operation center 20 through the input means 101 to the program controller 190. The program issue control signal from the program controller 190 is applied to the storage medium supply unit 115, the storage media 160 to 163 and the transmission processing device 180. In accordance with this control signal, as described above, the storage medium in the storage medium supply unit 115 is supplied to the storage media 160 to 163 thereby to control the reproduction, termination, etc. of the software of the storage media 160 to 163.

Further, the guide information for the program distributed to the subscriber 50 from the program distribution center 30 is generated in the program guide generator 191 in accordance with the information from the program controller 190, and applied to the transmission processing device 180. The transmission processing device 180 processes signals for transmission in accordance with, for example, the MPEG transmission standard described above. The signal thus processed for transmission is applied to the transmitter 31 and transmitted toward the satellite 40 from the transmitter 31.

Figure 3:
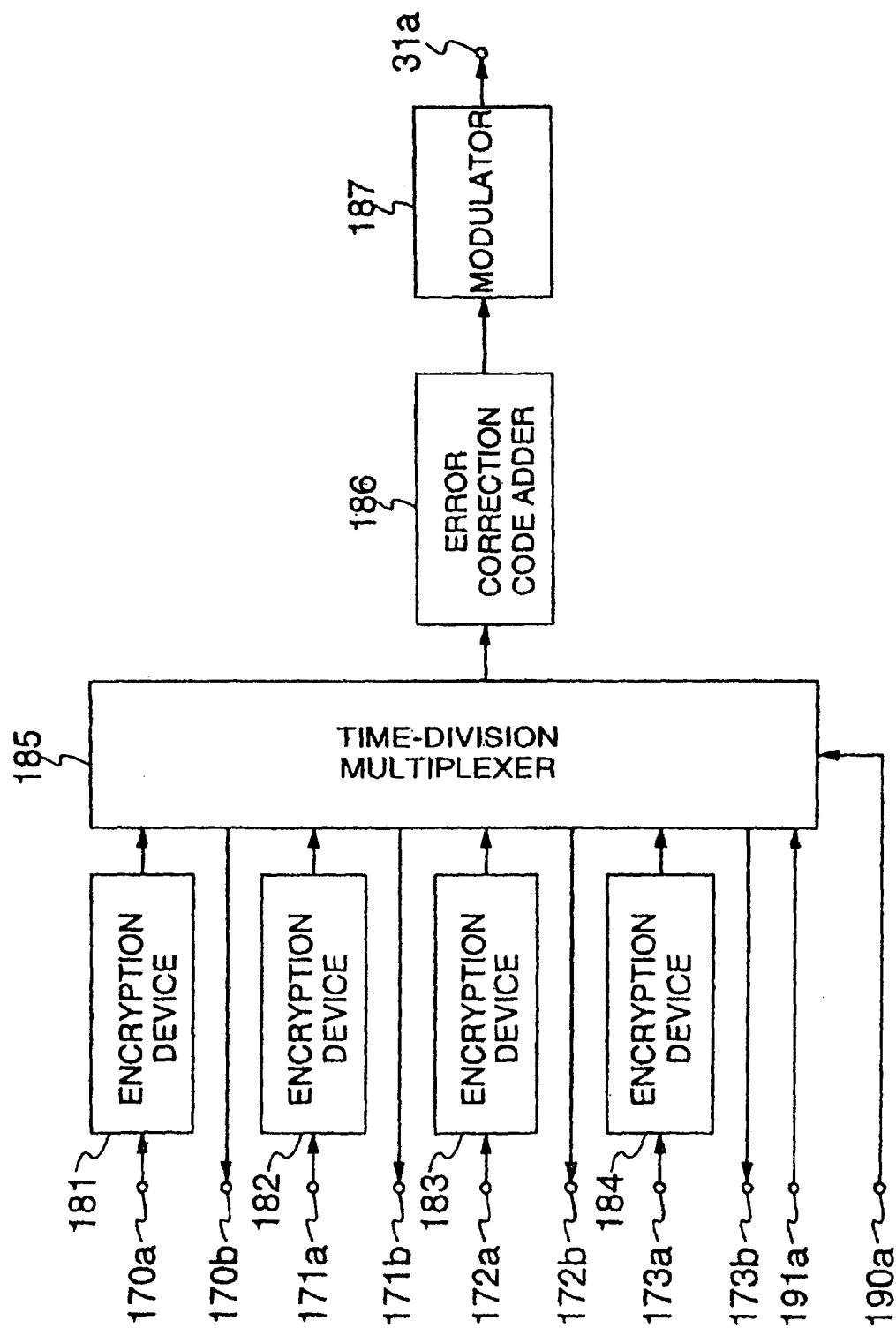
FIG. 3 is a block diagram showing a transmission processing device according to an embodiment of the invention.

FIG. 3 is a block diagram showing an example of the signal processing operation in the transmission processing device 180. In FIG. 3, numerals 170a to 173a, 190a, 191a designate input terminals, numerals 170b to 173b, 31a output terminals, numerals 181 to 184 encryptors, numeral 185 a time-division multiplexer, numeral 186 an error correction code adder, and numeral 187 a modulator.

In FIG. 3, the signals from the bit compressors 170a to 173 are applied through the input terminals 170a to 173a to the encryptors 181 to 184, respectively. The encryptors 181 to 184 encrypt the supplied programs as required. This encryption may be effected only on the video signal or the audio signal, or on both the video signal and the audio signal. The signal thus encrypted is applied to a time-division multiplexer 185. The terminal 190a is an input terminal for the signals from the program controller 190. The viewing right control signal (i.e. video and audio entitlement control message) for each program is applied through the terminal 190a to the time-division multiplexer 185. This signal includes a signal indicating whether a particular subscriber has the viewing right for the signal broadcast. Further, the time-division multiplexer 185 is supplied with program guide information from a program guide generator 191 through the input terminal 191a. Each signal is packeted in a predetermined format and compressed and multiplexed in a time axis domain. According to this embodiment, the viewing right control signal and the program guide information are shown without an encryptor. These signals, however, may also be encrypted.

The rate control information for each program is applied through the terminal 190a. This is the information for bit-compressing the program input from the bit compressor 170 in the range of 4 to 8 Mbps, and the program input from the bit compressor 171 in the range of 2 to 6 Mbps, for example. According to this information, the time-division multiplexer 185 controls the bit rate of the bit compressors 170 to 173. The time-division multiplexer 185 applies a control signal to the bit compressors 170 to 173 through the output terminals 170b to 173b. As a result, the bit rate of each program is controlled in such a way that the signal rate after time-division multiplexing is less than a predetermined value.

The output signal of the time-division multiplexer 185 is applied to the error correction code adder 186. In the case under consideration, an error correction code is added for correcting the transmission error caused by the noise in a satellite channel shown in FIG. 1, a CATV channel not shown or a telephone line. The output signal of the error correction coder is applied to the modulator 187, and in the case of the embodiment shown in FIG. 3, the programs of four channels are modulated on a single carrier thereby constituting a single transmission channel. The signal modulated on the single carrier is sent toward the transmitter 31 through the terminal 31a.

Although the embodiment shown in FIG. 2 has four storage media so that the transmission processing device 180 can be supplied with four programs, more programs can be time-division multiplexed by use of more storage media.

According to the embodiment shown in FIG. 2, signals for a single transmission channel are processed. Instead, signals for a plurality of transmission channels can be sent by providing a plurality of combinations of the storage media 160 to 163, the bit compressors 170 to 173 and the transmission processing device 180.

The transmission channel is defined as a signal modulated on a single carrier by time-division multiplexing a plurality of programs as described above. Each of a plurality of programs is referred to simply as a channel.

Figure 4:
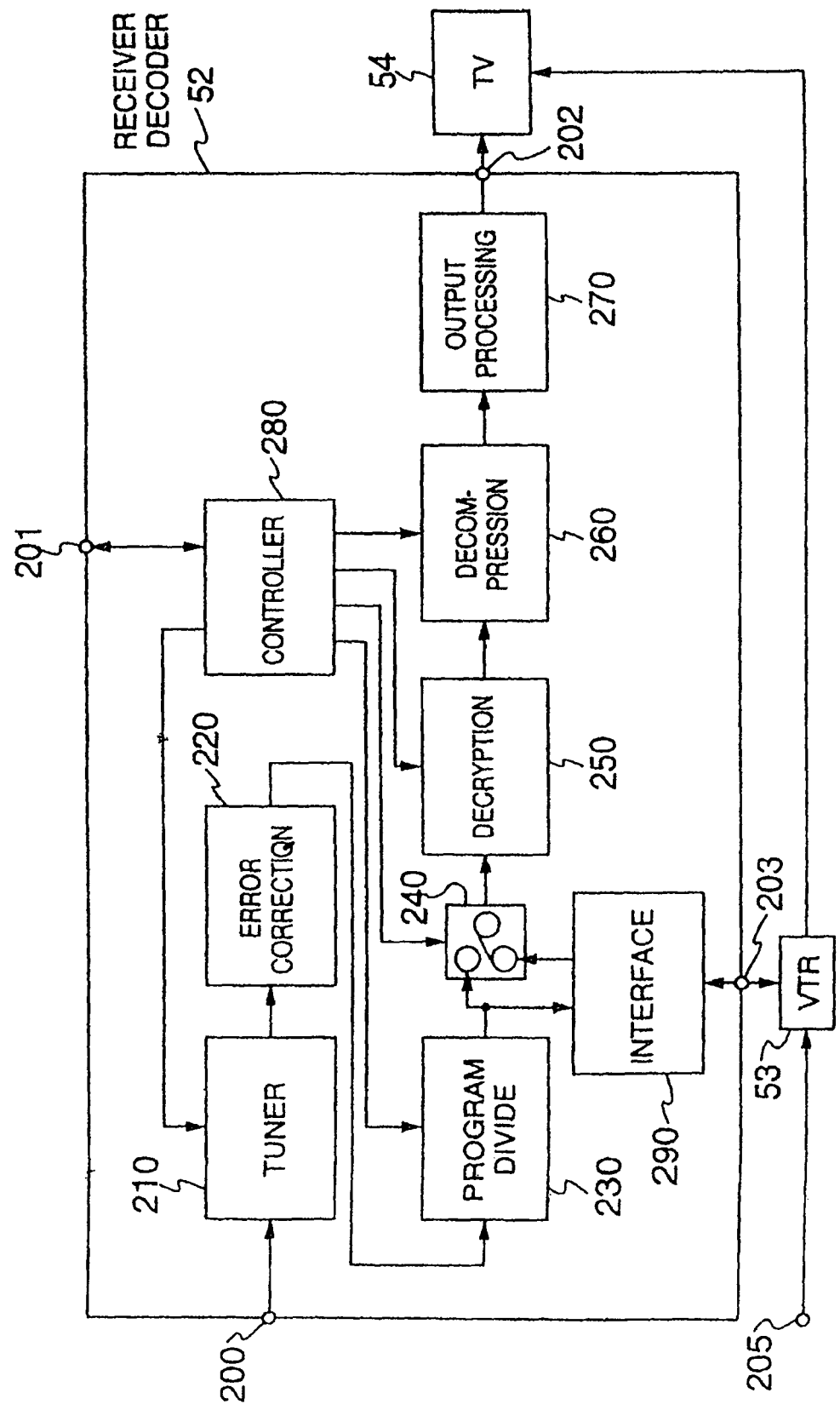
FIG. 4 is a block diagram showing a receiver decoder according to an embodiment of the invention.

FIG. 4 shows a specific example of the configuration of a receiver decoder at the subscriber household 50 (FIG. 1). In FIG. 4, numeral 200 designates an input terminal for a signal from the receiver 51, numeral 201 an input-output terminal for a signal for requesting a software from the operation center or a signal for exchanging the signal for determining the receiving conditions of a fee-charging broadcast, numeral 202 an output terminal for a signal restored, numeral 203 an input-output terminal for a signal exchanged with the VTR, numeral 205 an input terminal for a signal from the receiver 56 shown in FIG. 1, numeral 210 a tuner, numeral 220 an error correction circuit, 230 a program dividing circuit, numeral 240 a change-over circuit, numeral 250 a decryption circuit, numeral 260 a decoding or decompressing circuit for bit decompression, numeral 270 a signal output processing circuit, numeral 280 a control circuit, and numeral 290 an interface circuit.

The receiver 51 that has received a signal from the satellite 40 applies the received signal to the tuner 210 through the terminal 200. The tuner 210 selects from among the received signals the signal of a desired transmission channel in accordance with the control signal from the control circuit 280, and demodulates the signal modulated by the modulator 187 and applies the demodulated signal to the error correction circuit 220. The error correction circuit 220 corrects any error occurred mainly in the channel in accordance with the error correction code added by the error correction code adder 186 (FIG. 3). The signal the error of which has been corrected is applied to the program dividing circuit 230. The program dividing circuit 230 selects and outputs a desired program in accordance with the control signal from the control circuit 280 from a plurality of programs time-division multiplexed by the time-division multiplexer 185 on a single transmission channel.

The output signal of the program dividing circuit 230 is applied to the change-over circuit 240 and the interface circuit 290, and further through the terminal 203 to the VTR 53. The VTR 53 records the digital bit stream applied thereto, and at playback, applies a signal to the interface circuit 290 through the terminal 203 in the same format as the input bit stream. The output signal of the interface circuit 290 is applied to the change-over circuit 240. The change-over circuit 240 selects and outputs a signal from the program dividing circuit 230 when restoring the received signal and selects and outputs a signal from the interface circuit 290 when selecting and outputting a reproduced output signal of the VTR 53, in accordance with the control signal from the control circuit 280.

The output signal of the change-over circuit 240 is applied to the decryption circuit 250. The decryption circuit 250 decrypts the signal encrypted by the encryptors 181 to 184 (FIG. 3). The decrypted signal the decryption circuit 250 is applied to the decoding circuit 260, where the bits compressed at the bit compressors 160 to 163 are decoded and decompressed.

The bit-decompressed signal from the decoding circuit 260 is applied to the output processing circuit 270 as a component signal containing a luminance signal and two color difference signals. The two color difference signals applied to the output processing circuit 270 are subjected to quadrature modulation and thus converted into a carrier chrominance signal, so that the output processing circuit 270 produces the resulting carrier chrominance signal and the luminance signal. The output signal is applied through the terminal 202 to the TV receiver 54. Just in case the TV receiver 54 has only a composite input terminal, the output processing circuit 270 may produce a composite signal by adding the luminance signal and the carrier chrominance signal. Further, both a signal containing the luminance signal and the carrier chrominance signal and a composite signal may be produced.

Also, the signal applied from the receiver 56 through the input terminal 205 is recorded in the VTR 53 as required, and a reproduced signal is applied to the TV receiver 54. When the signal is not recorded in the VTR 53, on the other hand, the input signal or an equivalent signal is applied to the TV receiver 54. In the embodiment shown in FIG. 4, the signal not yet decrypted is recorded in the VTR 53, and therefore the signal is not decrypted at the time of recording in the VTR 53. The subscriber thus can record free of charge and can be charged each time of playback.

Figure 5:
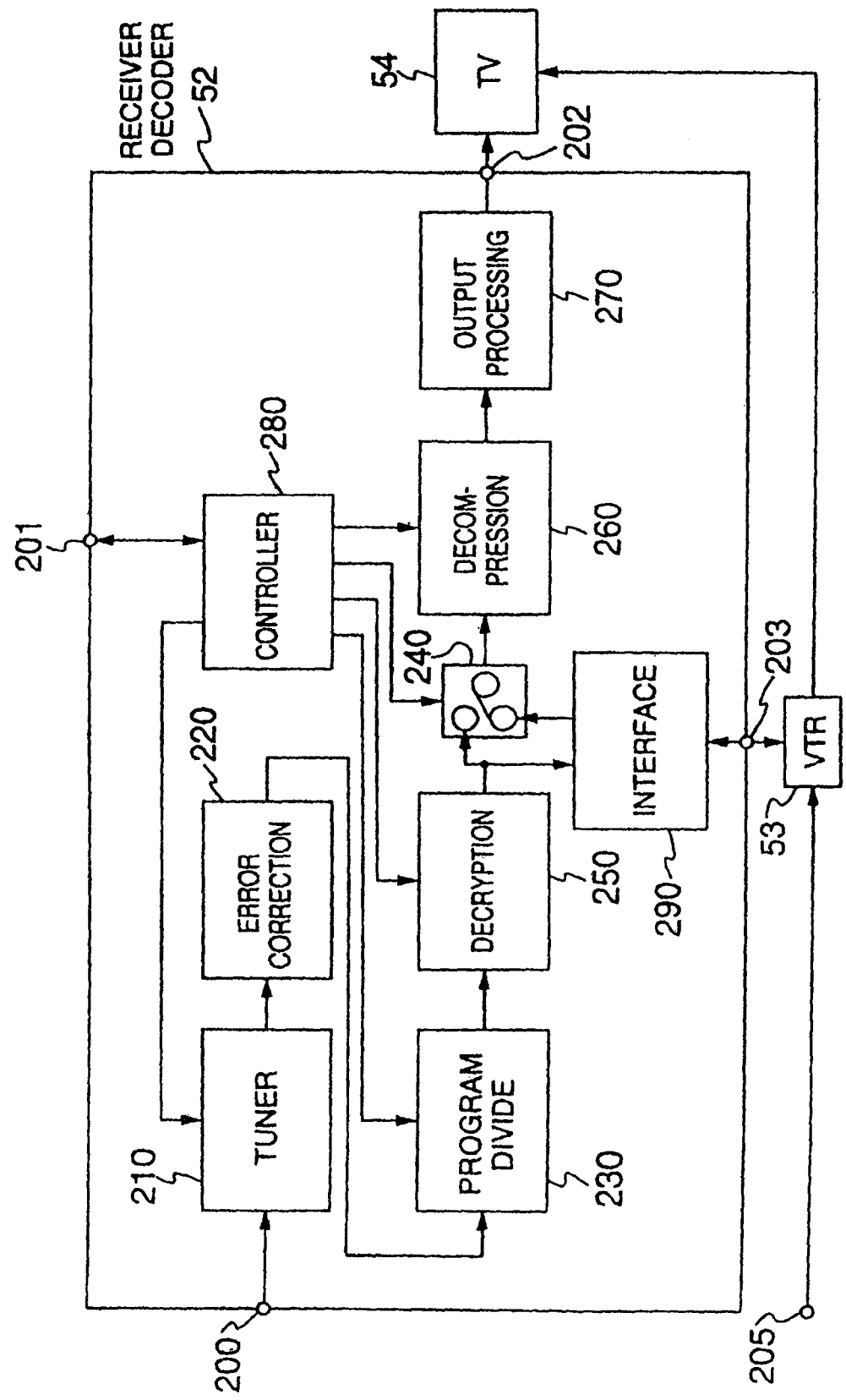
FIG. 5 is a block diagram showing a receiver decoder according to an embodiment of the invention.

FIG. 5 shows another specific example of the receiver decoder shown in FIG. 1 according to an embodiment. The component parts included in FIG. 5, which are partially shared by the embodiment of FIG. 4, are designated by the same reference numerals as the corresponding parts respectively and will not be described in detail.

According to the embodiment shown in FIG. 5, the change-over circuit 240 is located behind the decryption circuit 250 as compared with the embodiment shown in FIG. 4. Specifically, the output signal of the decryption circuit 250 is applied to the VTR 53 and the change-over circuit 240, and the output signal of the VTR 53 to the change-over circuit 240. The output signal of the change-over circuit 240 is applied to the decoding circuit 260.

The embodiment shown in FIG. 5 concerns the case of recording a signal decrypted at the decryption circuit 250. In this case, the decrypted signal is recorded in the VTR 53. Therefore, the subscriber is charged for decryption at recording, and can playback without being charged.

Although the decryption circuit 250 is arranged behind the program dividing circuit 230 in the embodiment shown in FIG. 5, the program dividing operation may be performed after decryption.

Figure 6:
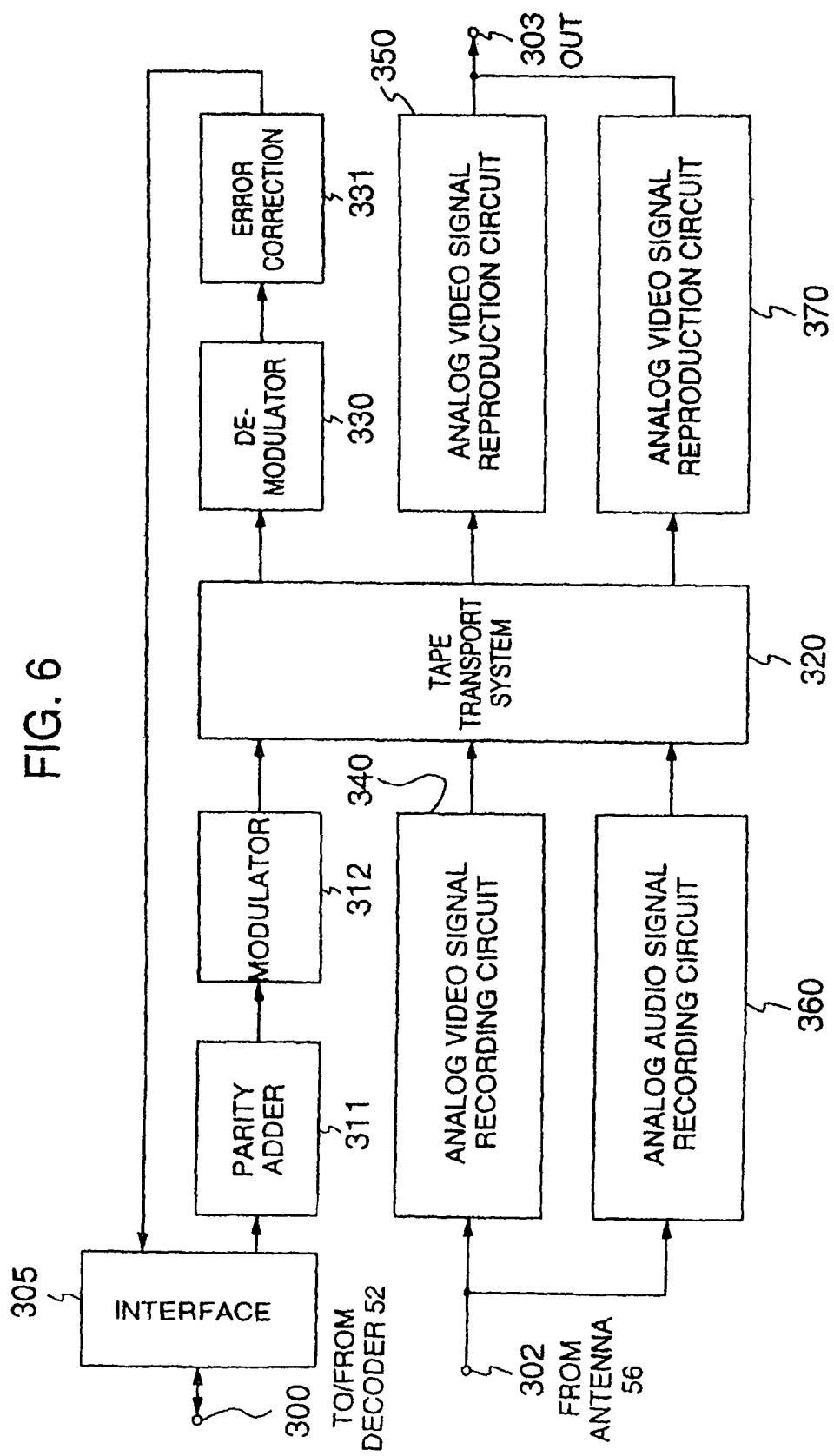
FIG. 6 is a block diagram showing a VTR according to an embodiment of the invention.

FIG. 6 is a block diagram showing a VTR 53 according to an embodiment. In FIG. 6, numeral 300 designates an input-output terminal for a signal from the receiver decoder 52 shown in FIG. 1, numeral 302 an input terminal for a signal from the receiver 56 shown in FIG. 1, numeral 303 an output terminal thereof, numeral 305 an interface circuit, numeral 311 a parity adder circuit, numeral 312 a modulation circuit, numeral 320 a tape transport system, numeral 330 a demodulation circuit, numeral 331 an error correction circuit, numeral 340 an analog video signal recording circuit, numeral 350 an analog video signal reproduction circuit, numeral 360 an analog audio signal recording circuit, and numeral 370 an analog audio signal reproduction circuit.

The signal applied through the input terminal 300 is applied to the parity adder circuit 311 through the interface circuit 305. The parity adder circuit 311 is for adding a parity code for correcting any error which may occur in the tape transport system 320. The output signal from the parity adder circuit 311 is applied to the modulation circuit 312. The modulation circuit 312 modulates the digital signal into a form suitable for the tape transport system 320. Such schemes as NRZ, NRZI, 8-10 conversion, MFM, M2, etc. are known for modulation. The modulated signal is applied to the tape transport system 320 and recorded in a magnetic tape.

At playback, the reproduced signal is applied to the demodulation circuit 330 where it is modulated in correspondence with the modulation circuit 312. The output signal of the demodulation circuit 330 is applied to the error correction circuit 331, where any error which may have occurred in the tape transport system 320 is corrected on the basis of the parity code added at the parity adder circuit 311. The output signal of the error correction circuit 331 is applied to the interface circuit 305, and after being converted into a signal in the same form as the signal input from the input terminal 300, is output from the terminal 300. The signal output from the terminal 300 is applied to the receiver decoder 52 shown in FIG. 1.

As seen from the embodiment of FIG. 6, the VTR 53 requires therein none of the bit compressors 170 to 173 shown in FIG. 2, and therefore a digital signal VTR small in circuit size can be realized. Also, no bit compressor is required in each VTR, but only at the program distribution center 30. Therefore, although the center increases in circuit size and cost, a high-performance bit compressor can be used, and the resulting higher relative bit compression ratio reduces the data rate of the digital signal transmitted. Consequently, the VTR 53 used by the subscriber can be improved in quality, reduced in cost and can record for a longer time.

An analog signal is applied through the terminal 302 from the receiver 56 to the analog video signal recording circuit 340 and the analog audio signal recording circuit 360, where the signal is processed according to the VHS standard, β standard or the 8-mm VTR standard, for example. The signal thus processed is applied to the tape transport system 320. The tape transport system 320 records the signal in accordance with respective formats as in the conventional VTR.

At playback, the signal reproduced at the tape transport system 320 is applied to the analog video signal reproduction circuit 350 and the analog audio signal reproduction circuit 370 which process the reproduced signal in a manner corresponding to the analog video signal recording circuit 340 and the analog audio signal recording circuit 360, respectively. The reproduced signal is applied appropriately to the TV receiver 54 shown in FIG. 1 through the output terminal 303. As a result, the digital broadcast and the conventional analog broadcast can be recorded using the same tape transport system.

FIG. 7 is a schematic diagram showing an example of a signal (or an output signal from the output terminal 31a shown in FIG. 3) output from the transmitter 31. The embodiment of FIG. 7 shows the case in which four programs are transmitted through a single transmission channel according to the embodiment shown in FIG. 2. Also, the embodiment concerns the case in which there are a number n of transmission channels (1) to (n). In FIG. 7, V1, V2, V3 and V4 designate video signals of four programs, A1, A2, A3, A4 audio signals for four programs, PG a signal representing program guide information, and VECM, AECM a control signal representing the viewing rights. Each of these signals is a signal constituting a packet.

In the embodiment shown in FIG. 2, the four programs generally have different transmission rates. From the instantaneous point of view, the data amount is increased or decreased. In order to efficiently control this variation, each information is packeted and time-division multiplexed as shown in FIG. 7. Details of the signal in the packet are described in the transmission standards referred to above. Though not shown in detail in the diagram of FIG. 7, the signal in each packet is encrypted by the encryptors 181 to 184 as required as explained with reference to FIG. 3. Also, the error correction code adder 186 adds an error correction code and the time-division multiplexer 185 adds header information such as a synchronization signal.

Figure 8:
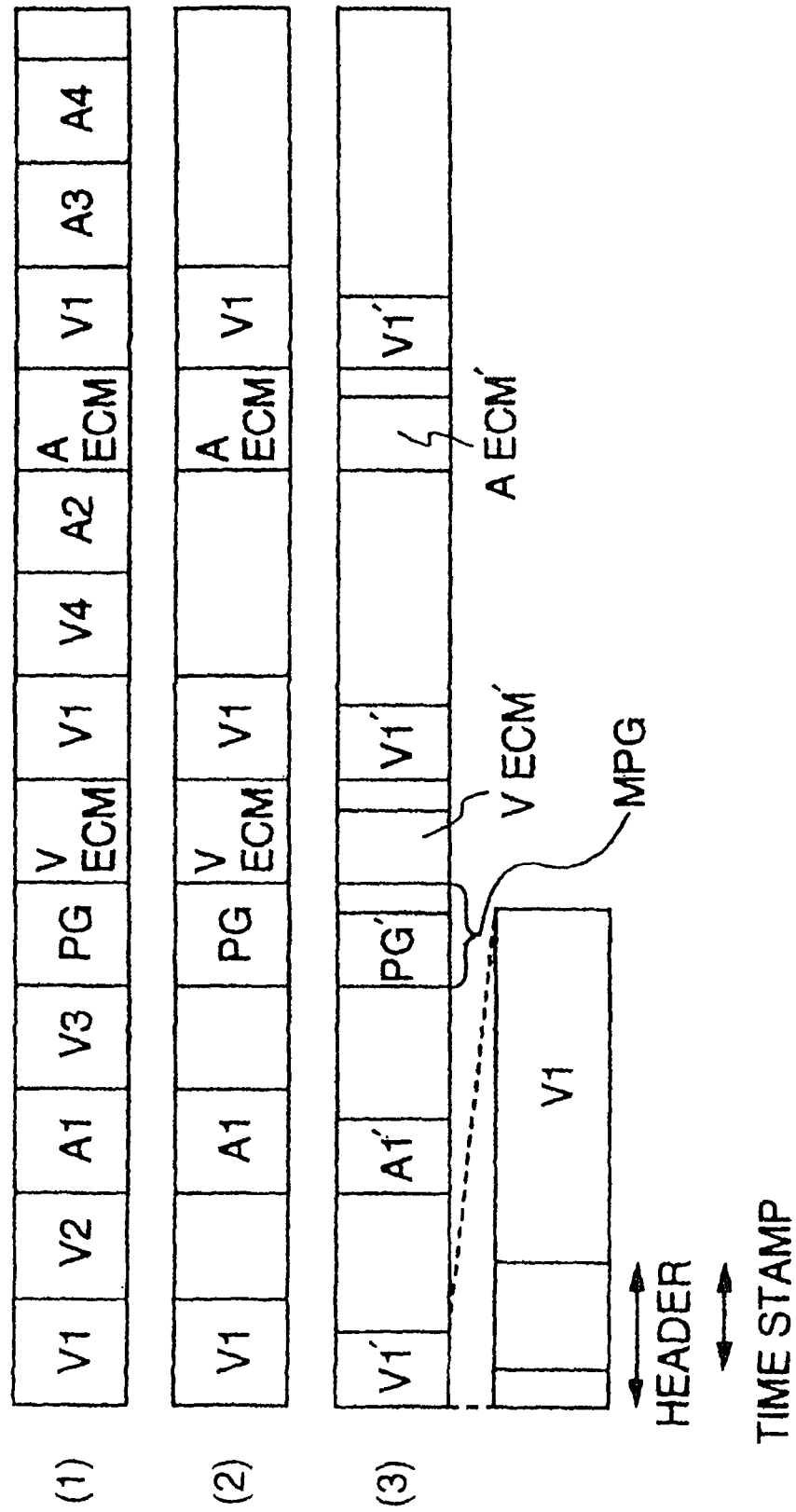
FIG. 8 shows signal waveforms according to the invention.

In the embodiments shown in FIGS. 4 and 5, signals designated by (1) to (n) in FIG. 7 are supplied through the terminal 200, and a signal for one of the transmission channels is selected at the tuner 210. In the case under consideration, the signal of FIG. 7(1) is assumed to have been selected. The selected signal shown in FIG. 7(1) whose errors corrected at the error correction circuit 220 is applied to the program dividing circuit 230. The program indicated by the suffix 1 is assumed to have been selected from the time-division multiplexed four programs at the program dividing circuit 230. In such a case, the program guide information PG, the viewing right control signals VECM, AECM are also separated and output at the same time as the video signal V1 and the audio signal A1. FIG. 8(2) shows the signal representing a divided program. FIG. 8(1) is identical to FIG. 7(1).

With reference to the embodiments shown in FIGS. 4 and 5, explanation will first be made about the case in which not the reproduced signal from the VTR 53 but the signal from the tuner 210 is selected directly by the change-over circuit 240. The signal divided into a program shown in FIG. 8(2) is decrypted by the decryption circuit 250. This decryption is performed according to the viewing right control signals VECM, AECM shown in FIG. 8(2). More specifically, in the case where a subscriber household has the right to view the program selected just now, the code is decrypted, while when the subscriber household has no right to view the program, the code is not decrypted. Instead, the absence of the viewing right is indicated or information indicating a method for acquiring the viewing right is output from the terminal 202. The output of this information is what is called the on-screen-display (OSD). This information is added to the video signal and output from the output processing circuit 270.

The signal decrypted is applied to the decoding circuit 260. The decoding circuit 260 corresponds to the bit compressors 170 to 173 shown in FIG. 2, and decodes a signal input according to the MPEG-2 standard, for example. In the case where a signal compressed according to the MPEG standard is decoded, it is necessary to synchronize the transmitted signal with the data to be decoded. In the case where the transmitted signal fails to be synchronized with the data to be decoded and the decoding rate is higher than the transmission rate, for example, the data runs short making the decoding impossible. In order to prevent such an inconvenience, a clock reference called SCR (System Clock Reference) or PCR (Program Clock Reference) is added to the packet according to the MPEG standard. At decoding, the decoding clock signal is restored according to this clock reference. This is described, for example, in MPEG-2 System Working Draft (ISO/IEC/JTC1/SC29/WG11 No. 601 MPEG92/November, 1993), pp. 20-25. As a result, the arrival time of each packet cannot be changed.

For the selected signal of FIG. 8(2) to be recorded in the VTR 53, therefore, it is necessary to conceive a method for making reproduction while maintaining time intervals of input packets.

A signal corresponding to FIG. 8(2) is applied as an input signal to the interface circuit 290. As an example, the bit rate of the signal output from the transmitter 31 shown in FIG. 2 is assumed to be 40 Mb/s. Among these bits, assume that the information in the amount 7/6 of the Viterbi code is assigned for error correction and that the header information of 17 bytes is added for 130 bytes of packets compressed by the bit compressor. Under the condition where an error is corrected by the error correction circuit 220 shown in FIGS. 5 and 6 and the header information required for transmission is removed, the bit rate is about 30 Mb/s as expressed by the following Equation (1):

$$40 \times (6/7) \times (139/147) = 30.3 \tag{1}$$

As shown in FIG. 8(2), packets exist successively at some parts and with intervals of several packets at other parts. For the VTR 53 to record while maintaining these time intervals of signals, a recording at higher rate than shown in Equation 1 is required. As shown in FIG. 8(2), packets are not sent for some time intervals. As far as packets can be packed for recording and restored to the original time intervals at the time of reproduction, therefore, the recording rate can be reduced as compared with the value shown in Equation 1. FIG. 8(3) shows signals applied to the VTR 53 from the interface circuit 290 in FIGS. 5 and 6 for recording the packets in packed state at the time of recording and restoring the packet intervals to the original time intervals at the time of reproduction.

FIG. 8(3) shows signals applied to the interface circuit 290 from the program dividing circuit 230 in the embodiment shown in FIG. 5 and from the decryption circuit 250 in the embodiment shown in FIG. 6. The interface circuit 290 adds information (time stamp) indicating the time of packet arrival as header information to the input signal. Another information than the time stamp may be further added as header information. Also, it is necessary to increase the packet transmission rate in order to add the header information such as a time stamp to the input signal to the interface circuit 290 shown in FIG. 8(2). FIG. 8(3) shows a model of such a case. More specifically, a packet is transmitted for a shorter transmission time in FIG. 8(3) than in FIG. 8(2).

Figure 9:
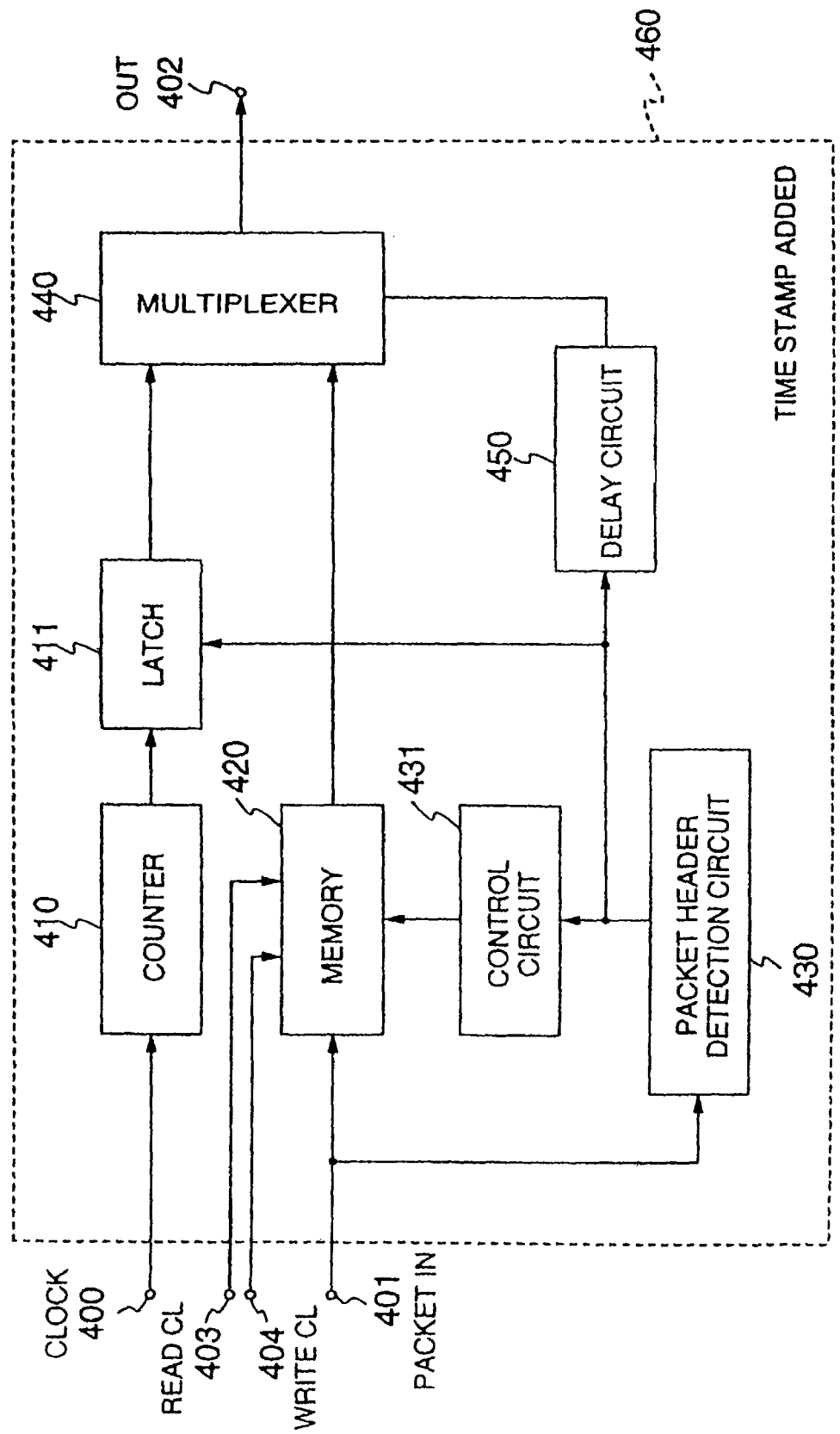
FIG. 9 is a block diagram showing a time stamp adder circuit according to an embodiment of the invention.

FIG. 9 shows a circuit for adding a time stamp according to an embodiment. Numeral 400 designates an input terminal for a clock signal to count the time stamp, numeral 401 an input terminal for a packet signal shown in FIG. 8(2), numeral 402 an output terminal for a signal to which a time stamp is added, numeral 410 a counting circuit, numeral 411 a latch circuit, numeral 420 a memory, numeral 430 a packet head detection circuit, numeral 431 a memory control circuit, numeral 440 a multiplexing circuit, and numeral 450 a delay circuit.

The packet signal shown in FIG. 8(2) is applied through the terminal 401 to the memory 420 and the packet head detection circuit 430. The packet head detection circuit 430 detects the head of the packet of the signal input, and the resulting detection signal is applied to the latch circuit 411, the control circuit 431 and the delay circuit 450. The clock signal supplied from the terminal 400, on the other hand, is applied to the counting circuit 410 thereby to count the clock signals continuously. The output signal from the counting circuit is applied to the latch circuit 411. The latch circuit 411 latches the count input by the packet head signal from the packet head detection circuit 430. The count thus latched is applied to the multiplexing circuit 440. This count provides time stamp information for a packet.

A control signal for the memory 40 is generated on the basis of the packet head detection signal applied to the control circuit 431. The clock signal applied from the terminal 404 is used as a write clock for the memory 420. This is by reason of the fact that the clock signal coincides with the packet signal frequency applied from the terminal 401. The clock signal applied from the terminal 403 is used as a read clock for the memory 420. A frequency higher than that of the write clock applied from the terminal 404 is selected as a frequency of this clock signal. In the case where the write clock frequency is 30.3 MHz according to Equation 1, for example, the read clock frequency is set to 49.152 MHz. This read clock constitutes a bus clock frequency of the signal sent to the VTR 53 from the terminal 203 shown in FIGS. 5 and 6. In the process, the clock signal for the counting circuit 410 applied from the terminal 400, i.e., the clock signal frequency for the time stamp is the same as the clock signal frequency applied from the terminal 403, for example. In this case, the same signal can be used for the bus clock signal applied from the terminal 403 as the clock signal for the time stamp. This is, however, not to limit the time stamp clock frequency to the same frequency as the bus clock frequency.

After a predetermined length of time after a packet is applied to the memory 420, the packet is read from the memory. The frequency of the read clock signal is set higher than the write clock signal frequency. Therefore, the transmission time of the output packet can be reduced as compared with the transmission time of the input packet signal as shown in FIGS. 8(2) and 8(3). As a result, even where a succession of packets are transmitted, as shown in FIG. 8(3), a period of time is available for adding the header information including the time stamp. The output signal of the memory 420 is applied to the multiplexing circuit 440.

The delay circuit 450 delays the packet head detection signal and outputs a gate signal indicating the position of addition of the time stamp signal in accordance with the packet signal output from the memory 420. The particular gate signal is applied to the multiplexing circuit 440, where the time stamp from the latch circuit 411 is added and the signal shown in FIG. 8(3) is output from the terminal 402 in accordance with the gate signal.

Figure 10:
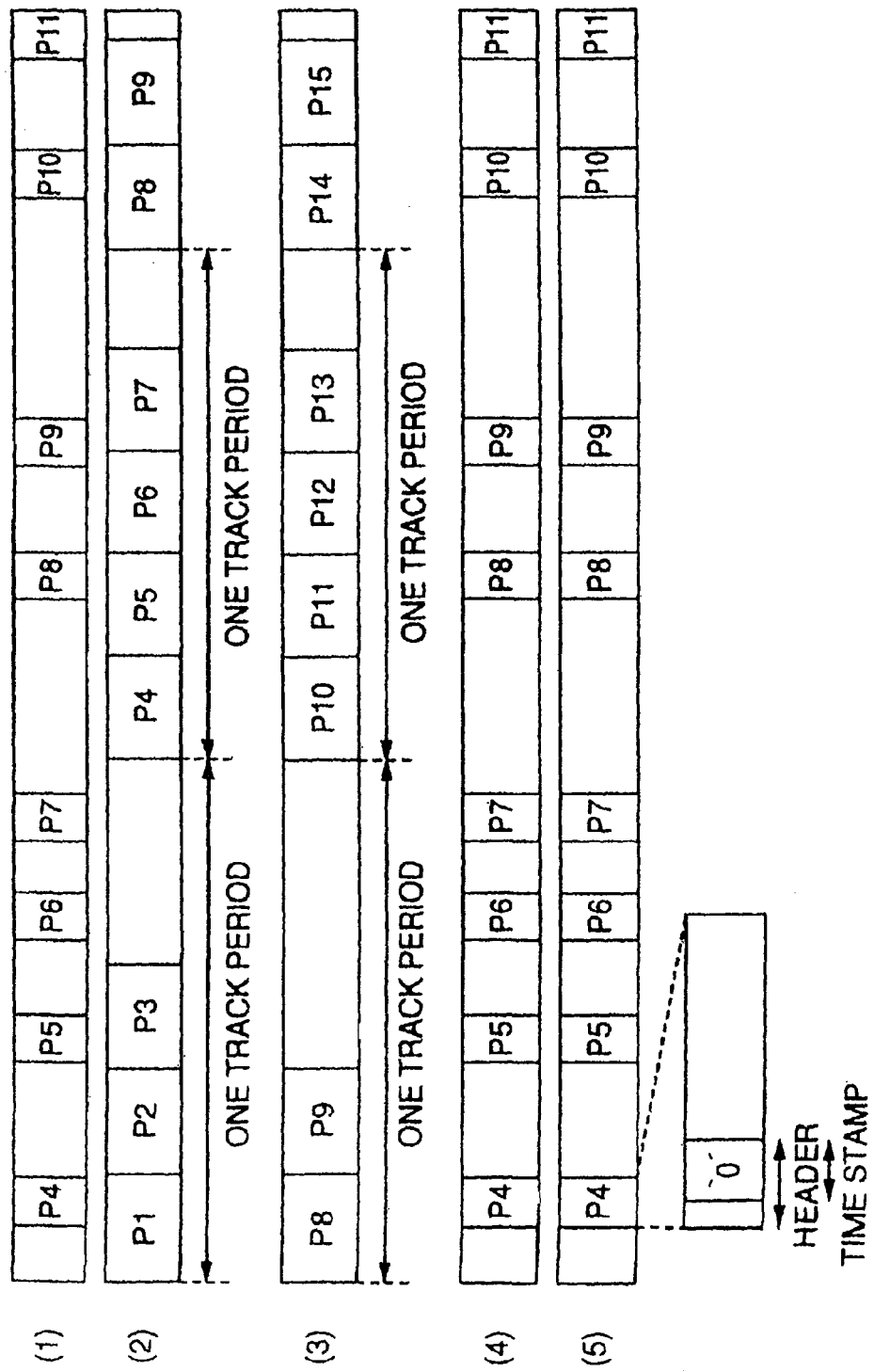
FIG. 10 shows signal waveforms according to the invention.

The signal shown in FIG. 8(3) is applied through the terminal 203 shown in FIGS. 5 and 6 to the VTR 53. FIG. 10(1) shows signals corresponding to FIG. 8(3), and characters P1, P2, . . . designate input packet signals. In the VTR 53, as shown in FIG. 7, the packet signals P4, P5, . . . shown in FIG. 10(1) are applied to the parity adder circuit 311 through the terminal 300 and the interface circuit 305. The parity adder circuit 311 includes a memory (not shown) of a capacity for storing at least as many signals as to be recorded in a single track, which memory stores the packet signals P4, P5, . . . . The parity adder circuit 311 outputs packet signals in packed state as shown in FIG. 10(2). There are gaps formed between the packets of the input signal shown in FIG. 10(1) as explained with reference to FIG. 8. Since the packet signals are output with the gaps thereof closed, as shown in FIG. 10(2), however, the rate of the output signal is lower than that of the input packet signals. The recording rate for the tape transport system 320 can thus be reduced. In FIG. 10, the output signal (2) are shown delayed behind the input signal (1) by a track of period for the sake of simplicity. However, the delay is not limited to a track of period but may be as required for the signal processing.

Figure 11:
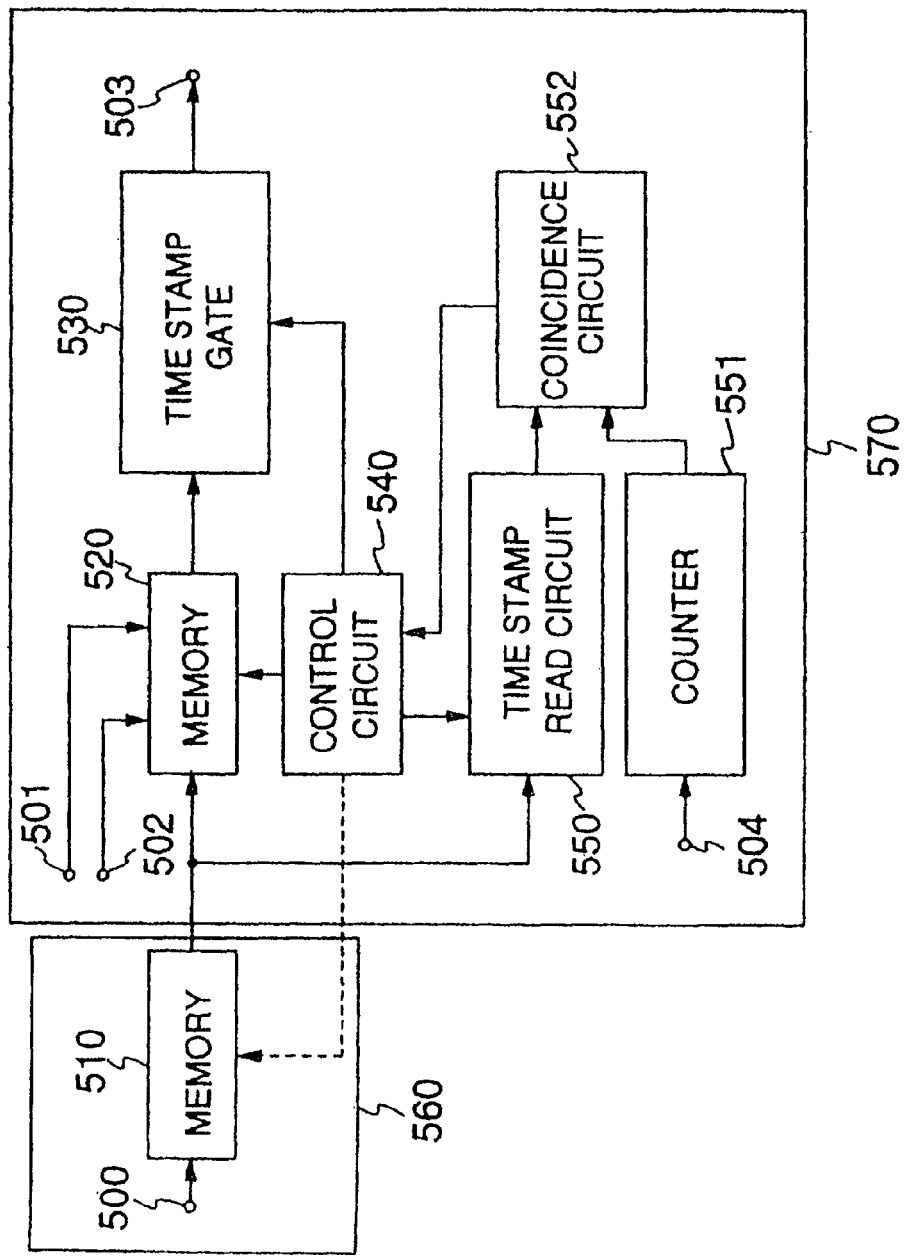
FIG. 11 is a block diagram showing a time axis adjusting circuit according to an embodiment of the invention.

At the time of reproduction, the signal reproduced and output from the tape transport system 320 is applied through the demodulation circuit 330 to the error correction circuit 331. The signal applied to the error correction circuit 331 is, as in the case of FIG. 10(2), composed of packet signals P1, P2, . . . in packed state. FIG. 10(3) shows a reproduced input signal for the error correction circuit. The error correction circuit 331 also has a memory (not shown) of a capacity corresponding to the signal for one track period. The input signal shown in FIG. 10(3) is applied to the memory in the error correction circuit 331. FIG. 11 is a block diagram showing an embodiment of a time axis adjusting circuit for restoring the intervals of the reproduced packet signals P1, P2, . . . to the original length. FIG. 10(4) shows the reproduced packet signals P1, P2, . . . whose intervals are restored to the original length.

In FIG. 11, numeral 510 designates a memory in the error correction circuit 331, numeral 500 an input terminal for the memory 510, numeral 520 a memory, numeral 501 a read clock input terminal for the memory 520, numeral 502 a write clock input terminal for the memory 520, numeral 503 an output terminal for the signal with time axis adjusted, numeral 551 a counting circuit, numeral 504 an input terminal for the clock signal for the counting circuit 551, numeral 530 a time stamp gate circuit, numeral 540 a control circuit, numeral 550 a time stamp read circuit, numeral 552 a coincidence detection circuit, numeral 560 a circuit block built in the error correction circuit 331, and numeral 570 a circuit block built in the interface circuit 305.

The reproduced signal shown in FIG. 10(3) applied from the terminal 500 shown in FIG. 11 is applied to the memory 510. The signal output for each of the packets represented by the packet signals P1, P2, . . . from the memory 510 is applied to the memory 520 and the time stamp read circuit 550. The read operation of the memory 510 and the write and read operation of the memory 520 are controlled by the control signal from the control circuit 540. The time stamp read circuit 550 is also supplied with the control signal from the control circuit 540 and outputs a signal indicating the position of the time stamp signal with respect to the signal from the memory 510, thereby reading the time stamp signal at the correct position. The time stamp signal thus read is applied to the coincidence detection circuit 552.

A clock signal of the same frequency as that input from the terminal 400 shown in FIG. 9 is applied from the terminal 504 to the counting circuit 551. The counting circuit 551 counts the clock signal thus input and outputs the count to the coincidence detection circuit 552. The coincidence detection circuit 552 outputs a coincidence signal when the two input signals coincide with each other, which coincidence signal is applied to the control circuit 540.

The control circuit 540 causes a packet signal to be read from the memory 520 in accordance with the coincidence signal. FIG. 10(4) shows a signal thus read out. The read operation is performed in accordance with the read clock signal applied from the read terminal 501. At the same time, a new packet is applied from the memory 510, and is written in the memory 520 on the basis of the write clock applied from the terminal 502. The clock signal frequency applied from the terminal 501 is determined in such a manner as to correspond to the signal rate between the terminal 203 and the VTR 53 shown in FIGS. 5 and 6.

The packet signals P1, P2, . . . with time axis adjusted and output from the memory 520 are applied to a time stamp gate circuit 530. The time stamp gate circuit 530 gates the time stamp signal as required, so that all the time stamp signals are fixed to 0 or 1 level, for example. As shown in FIG. 10(5), the signal rearranged to the same time intervals as the signal shown in FIG. 10(1) from the terminal 300 shown in FIG. 7 is output from the terminal 503.

As a result of the above-mentioned operation, signals of the same packet intervals as the one shown in FIG. 8(3) are applied from the terminal 203 shown in FIGS. 5 and 6 to the interface circuit 290. The interface circuit 290 deletes the header information as required and applies the resulting signal to the switch circuit 240. Hence, the same signal as the one from the tuner 210 applied from the other input terminal of the switch 240 is restored.

A VTR for recording digital signals has a feature that the image quality is not deteriorated after repetitive dubbing due to the sufficient error correction effected as shown in FIG. 7. Nevertheless, repeated dubbing without a deterioration of image quality may fail to protect the rights of copyright holders sufficiently. In order to avoid this inconvenience, there is provided a technique for preventing dubbing according to the invention.

As shown in FIG. 11, the time axis adjusted packet signals P1, P2, . . . output from the memory 520 are applied to the time stamp gate circuit 530. The time stamp gate circuit 530 sets all the signals for the period corresponding to the time stamp shown in FIG. 8(3) to, say, 0 level or 1 level, as described above. As a result, the information indicating the time intervals of the packets disappears from the packet signals P1, P2, . . . output from the interface circuit 305 shown in FIG. 7. When the output signal from the terminal 300 is applied to and recorded in the VTR shown in FIG. 7, therefore, the signal shown in FIG. 10(3) is reproduced. Since the signal indicating the time stamp position included in each packet which may be read contains no information indicating the time intervals, the original time intervals cannot be restored. In the case where all the signals at the position corresponding to the time stamp are at 0 or 1 level, the circuit shown in FIG. 11, after reading a packet, reads the next packet after the lapse of a time corresponding to the number of bits of the time stamp. Generally, the number of bits of a time stamp is set in such a manner that the period indicated by the particular number of bits is longer than one track period. The signal of the next track, therefore, is written in the memory 510 before all the packet signals are read from the memory 510. As a result, it is no longer possible to output signals corresponding to input signals. Thus the dubbing can be inhibited.

The foregoing description concerns the case in which all the signals at the position corresponding to the time stamp are set to 0 or 1 level. Alternatively, the same effect can be attained in the time stamp gate circuit 530 by changing at least a bit of the signal at the position of the time stamp. As a result, when the reproduced signal is recorded in another VTR, it is no longer possible to restore the packets to the original position. The dubbing can thus be inhibited.

As header information other than the time stamp shown in FIG. 8(1), a control signal may be added in order for the receiver decoder to change the time stamp, the control signal being used for judging whether all bits of the output time stamp are changed to 0 or 1 level or whether at least one bit is changed.

Next, a method of restricting reproducing signals recorded with VTR 53 will be described. Table 1 shows example of the contents described in the program guide information PG shown in FIGS. 7 and 8.

TABLE 1

| Channel | V PID | A PID | VE PID | AE PID | Title | Start time | End time | Date | Time |
|---|---|---|---|---|---|---|---|---|---|
| 100 | V100 | A100 | VE100 | AE100 | News | 18:00 | 19:00 | Jan. 01, 1995 | 18:05:30:00 |
| 100 | V100 | A100 | VE100 | AE100 | News | 19:00 | 20:00 | | |
| 100 | V100 | A100 | VE100 | AE100 | News | 20:00 | 21:00 | | |
| . | . | . | . | . | . | . | . | | |
| . | . | . | . | . | . | . | . | | |
| . | . | . | . | . | . | . | . | | |
| 101 | V101 | A101 | VE101 | AE101 | Baseball A-B | 18:00 | 20:30 | | |
| 101 | V101 | A101 | VE101 | AE101 | Baseball C-D | 20:30 | 23:00 | | |
| . | . | . | . | . | . | . | . | | |
| . | . | . | . | . | . | . | . | | |
| . | . | . | . | . | . | . | . | | |

As shown in Table 1, the program guide information PG includes information V PID for identifying a packet of the video signal for each channel, information A PID for identifying a packet of the audio signal, information VE PID for identifying a video entitlement control message packet and AE PID for identifying an audio entitlement control message packet, a program title, a program start time, a program end time, and the like. The program guide information PG also includes a date and time when the program guide information was received by the subscriber 50. As shown in FIG. 2, since a plurality of programs are multiplexed on one transmission channel, a program is required to be selected from a transmission channel selected by the tuner 210. In order to discriminate between the packets of the video signal, audio signal, program guide information, and viewing right information, different identification PIDs are added. Therefore, although different identification PIDs are required to be added to packets of the same transmission channel, the same packet identification information may be added to the packets of different transmission channels.

The program guide packet PG is decoded by the decoding circuit 260 and output to the TV receiver 54 via the terminal 202 to select the channel of a program to be watched.

If only one program is recorded with VTR 53 and it is to be reproduced, the program is desired to be directly reproduced without selecting the channel from the program guide information. To this end, the program guide packet itself is not recorded, but it is recorded after being changed in accordance with the program to be recorded. FIG. 8(3) shows an example of a recorded signal. The program information packet PG shown in FIG. 2 is changed, for example, by the interface circuit 290 so as to have the format limiting only to the channel information of the program to be recorded. FIG. 8(3) shows this changed program information packet MPG.

TABLE 2

| Channel | V PID | A PID | VE PID | AE PID | Title | Start time | End time | Date | Time |
|---|---|---|---|---|---|---|---|---|---|
| 100 | V100 | A100 | VE100 | AE100 | News | 18:00 | 19:00 | Jan. 01, 1995 | 18:05:30:00 |

Figure 12:
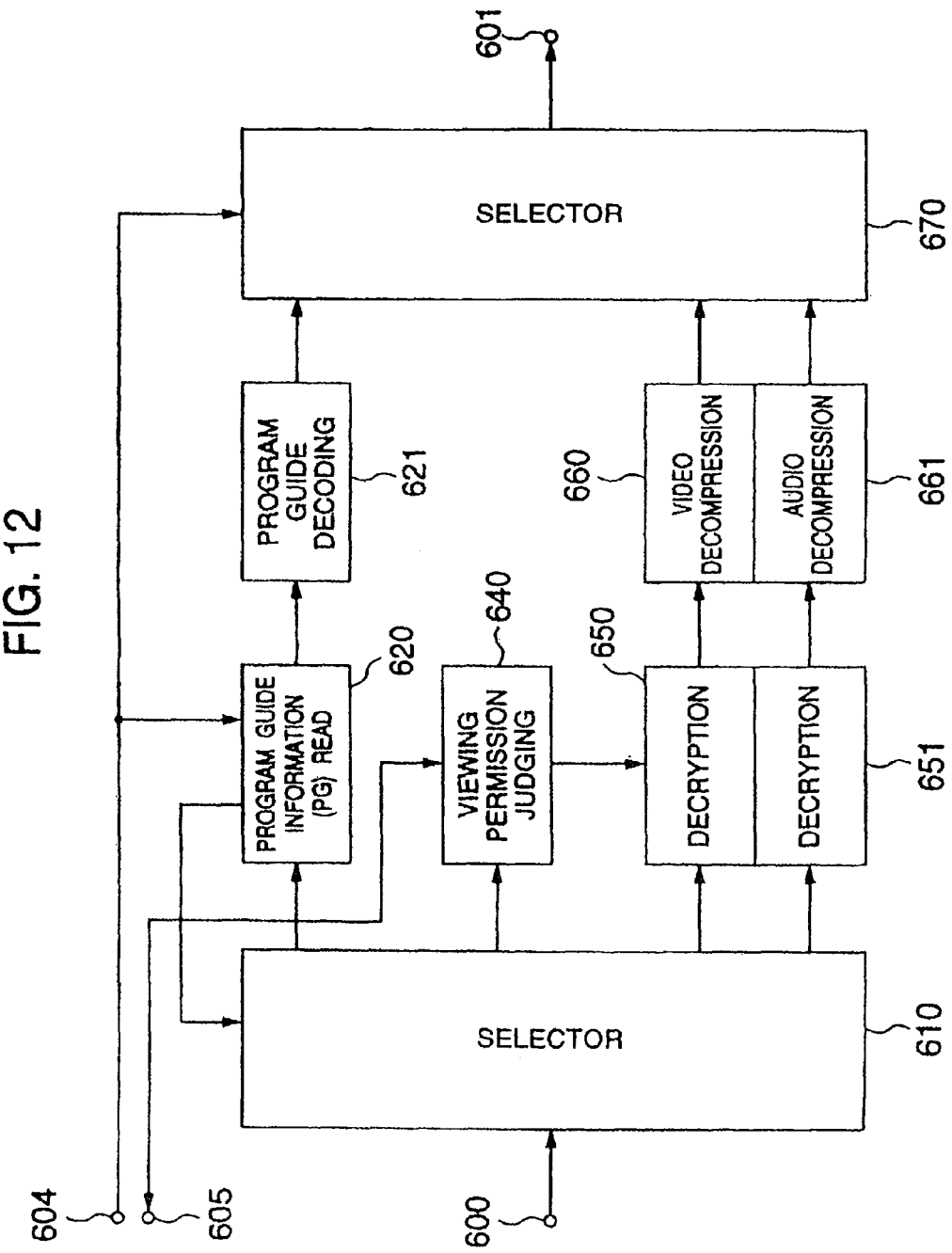
FIG. 12 is a block diagram showing a decryption circuit and a decompression circuit according to an embodiment of the invention.

FIG. 12 is a block diagram showing the details of the decryption circuit 250 and decoding circuit 260 shown in FIG. 4, according to another embodiment. In FIG. 12, reference numeral 600 represents an input terminal for a signal from the change-over circuit 240, reference numeral 601 represents an output terminal, reference numeral 604 represents an input/output terminal for a control signal to be transferred to and from the control circuit 280, reference numeral 605 represents an input terminal of a control signal from the control circuit 280, reference numeral 610 represents a selector, reference numeral 620 represents a program guide information read circuit, reference numeral 621 represents a program information decoding circuit, reference numeral 640 represents a viewing permission judging circuit, reference numerals 650 and 651 represent a decryption circuit, reference numeral 660 represents a video signal decompression circuit, reference numeral 661 represents an audio signal decompression circuit, and reference numeral 670 represents a selector.

First, the case where a signal received by the tuner 210 is inputted, will be described. The signal corresponding to FIG. 8(2) is applied to the terminal 600. The program information packet PG has the same packet discrimination information for all transmission channels. Therefore, in accordance with this packet discrimination information, the selector 610 selects the program guide information packet PG having the contents shown in Table 1. The program information read circuit 620 reads the program guide information and supplies it to the program guide decoding circuit 621 which in turn decodes it and supplies the results to the selector 670. A control signal from the control circuit 280 is applied to the terminal 604 and supplied to the program guide information read circuit 620 and selector 601. If the program guide information is selected, the selector 670 selects the signal input from the program guide decoding circuit 621 and outputs it from the terminal 601. This signal is then supplied via the output processing circuit 270 and terminal 202 to the TV receiver 54 to display the program guide.

When a channel of a program is selected while looking at the displayed program guide information, the channel information is supplied via the terminal 604 from the control circuit 280 to the program guide read circuit 620 which reads the input packet discrimination information of the channel and supplies it to the selector 610. In accordance with the input packet discrimination information, the selector 610 supplies the video packet V1, audio packet A1, viewing right information packets VECM and AECM to the video decompression circuit 660, audio decompression circuit 661, and viewing permission judging circuit 640, respectively.

The viewing permission judging circuit 640 transfers the control signal to and from the control circuit 280 via the terminal 605. In accordance with the input viewing right information packets VECM and AECM, the viewing permission judging circuit 640 judges whether the packets input to the decryption circuits 650 and 651 are to be decrypted. If the recorded program is to be charged, a control signal indicating a charged program is supplied to the control circuit 280 via the terminal 605. The control circuit 280 stores a charged toll of the program and supplies a viewing permission control signal to the viewing permission judging circuit 640 via the terminal 605. The viewing permission judging circuit 640 generates, if necessary, decryption information by using the viewing right information packets VECM and AECM, and supplies the packets to the decryption circuits 650 and 651. In accordance with signals input from the viewing permission judging circuit 640, the decryption circuits 650 and 651 decrypt the video packet V1 and audio packet A1. The decrypted video and audio packets V1 and A1 are supplied to the video decompression circuit 660 and audio decompression circuit 661.

The bit compressed video and audio signals are decompressed by the video and audio decompression circuits 660 and 661 and supplied to the selector 670. In accordance with the control signal input from the terminal 604, the selector 670 outputs the decompressed or decoded video and audio signals from the terminal 601.

Next, the case where a signal reproduced by VTR 53 is inputted, will be described. In this case, a signal corresponding to FIG. 8(3) is inputted. Since the changed program information packet MPG has the same packet discrimination information as the program guide information packet before the change, this packet MPG is supplied via the selector 610 to the program guide read circuit 620. If a signal for selecting the program guide information is supplied via the terminal 604, the same process as when the signal is inputted from the tuner 210 is performed to display on the TV receiver 54 the program information reproduced by VTR 53 and having the contents shown in Table 2.

If the signal for selecting the program guide information is not supplied via the terminal 604, the program guide read circuit 620 supplies the selector 610 with the packet discrimination information of the video and audio packets V1 and A1 and viewing right information packets VECM and AECM of the program reproduced. These packets are then supplied to the decryption circuits 650 and 651 and viewing permission judging circuit 640. As shown in Table 2, since the changed program guide information packet has only the information of the recorded program, the packet discrimination information is supplied from the program guide read circuit 620 to the selector 610 without designating the channel.

Also in the reproduction or at replay, in accordance with the viewing right information packets VECM and AECM, the viewing permission judging circuit 640 judges whether the packet is reproduced, and performs a toll charging process if required. Therefore, the recorded tape cannot be reproduced freely, and the rights of copyright holders and service suppliers can be protected.

Figure 13:
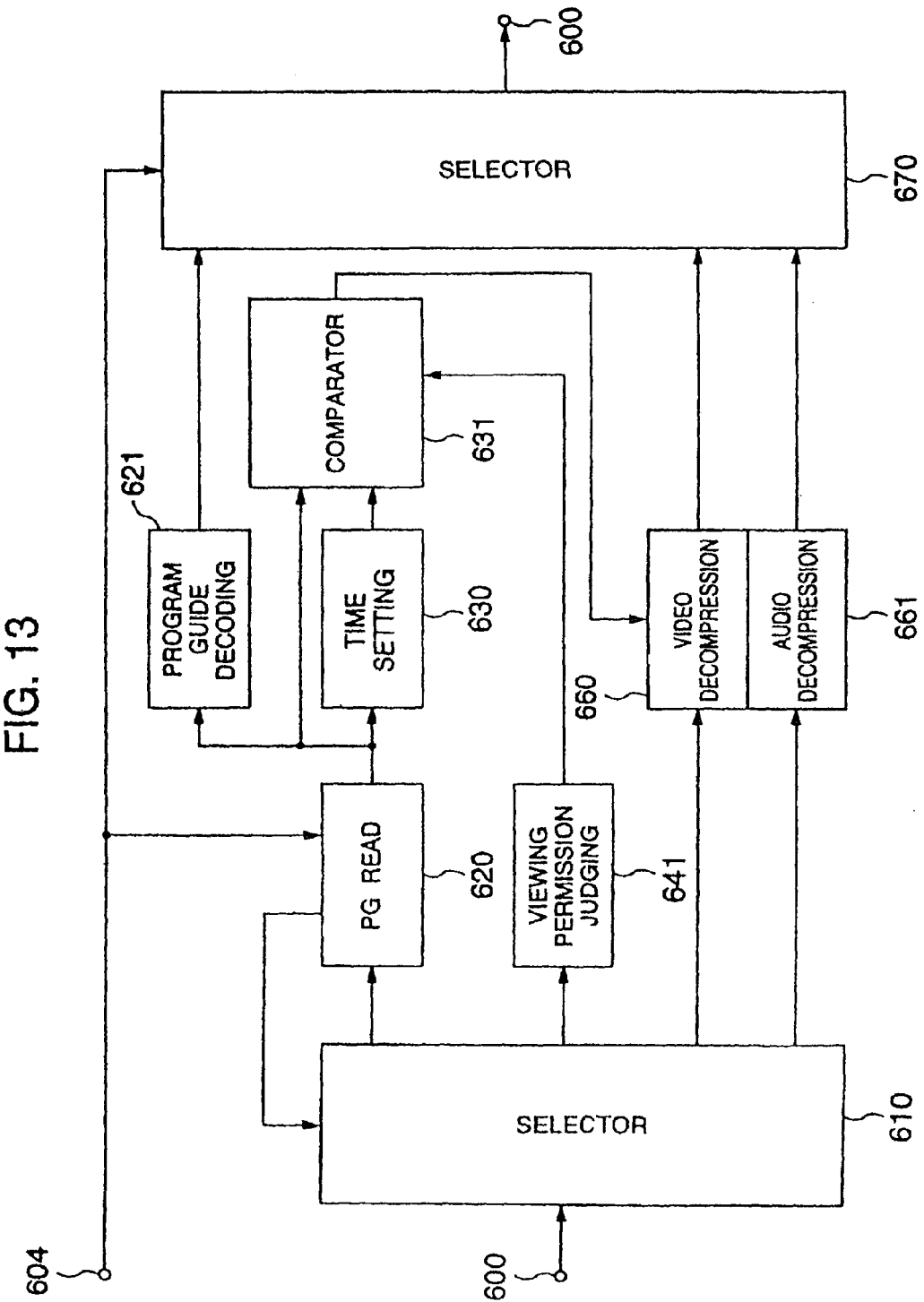
FIG. 13 is a block diagram showing a decompression circuit for the time stamp according to the invention.

Another embodiment of the decryption and decoding circuits of the embodiment shown in FIG. 5 is shown in FIG. 13. Some elements shown in FIG. 13 are shared by the embodiment shown in FIG. 12. The shared elements are represented by identical reference numerals, and the detailed description thereof is omitted. In FIG. 13, reference numeral 630 represents a time setting circuit, reference numeral 631 represents a comparator, and reference numeral 641 represents a viewing permission judging circuit.

First, the case where a signal received by the tuner 210 is inputted, will be described. The signal corresponding to FIG. 8(2) is applied to the terminal 600. The program information packet PG has the same packet discrimination information for all transmission channels. Therefore, in accordance with this packet discrimination information, the selector 610 selects the program guide information packet PG having the contents shown in Table 1, and supplies it to the program information read circuit 620 which supplies the time setting circuit 630 with the date and time when the program information packet PG was received. In accordance with the supplied date and time information, the time setting circuit 630 sets the current time. The program guide information shown in Table 1 is inputted to the program guide decoding circuit 621 to decode the program guide information and supply it to the selector 670. If the control signal from the control circuit is input from the terminal 604 and the program guide information is selected, the selector 670 outputs the decoded program guide information.

Similar to the embodiment shown in FIG. 12, if the control signal for selecting a desired channel is input from the terminal 604, the program guide read circuit 620 supplies the packet discrimination information to the selector 610 which in turn supplies the video and audio packets to the video and audio decompression circuits 660 and 661, respectively. The bit compressed signals are decompressed and inputted to the selector 670 which in accordance with the control signal supplied from the terminal 604, outputs the bit compressed signals.

If a signal reproduced by VTR 53 is inputted, similar to the embodiment shown in FIG. 12, the changed program guide information packet MPG shown in Table 2 is inputted to the program guide information read circuit 620. Of this packet MPG, the date and time information is supplied to the comparator 631. The input date and time information is the information when the program was recorded in VTR 53. The current date and time are inputted from the time setting circuit 630 to the comparator 631 to compare the current date and time with those when the program was recorded. The viewing right information packets VECM and AECM of the reproduced program are supplied from the selector 610 to the viewing permission judging circuit 641 which judges whether the program has or has not a reproduction limit, and outputs the judgement result to the comparator 631. If the program has not a reproduction limit, the comparator 631 does not output the control signal restricting the signal expansion to the video and audio decompression circuits 660 and 661. If the program has a reproduction limit, this reproduction limit condition is notified to the comparator 631. The reproduction limit condition is, for example, to allow the reproduction only the day when the program was recorded, or for three days or seven days after the record. In accordance with this condition, the reproduction permission is judged based upon a difference between the current date and time and the recorded date and time as obtained by the comparator 631. In accordance with this reproduction permission or inhibition, and in the case of the reproduction inhibition, a signal restricting the expansion or decompression is supplied to the video and audio decompression circuits 660 and 661. In this manner, the recorded tape cannot be reproduced freely and the rights of copyright holders and service suppliers can be protected.

According to the present invention, even if the recorded tape is copied, only a tape of the same condition is formed. Therefore, even if a tape is copied without permission of copyright holders or service suppliers, images and sounds of the copied tape are restricted and a so-called pirated edition tape cannot be formed.

Furthermore, since the current time is set in accordance with the received signal, the current time will not be changed or will not be shifted by subscribers. With the same reasons, the lapse time after the record can be correctly shown and cannot be changed by subscribers, so that the rights of copyright holders and service subscribers can be protected.

What is claimed:

1. A digital signal reproducing apparatus for reproducing a compressed digital signal from a recording medium, comprising:
a reproducing unit which reproduces a digitally packetized signal including a digital compressed audio signal, video signal, and clock reference signal from the recording medium, the digitally packetized signal being in a form of fixed length packets, each fixed length packet being formed by adding a time stamp indicating an output timing of the fixed length packet;
a counter which counts a value by a reference clock; and
an output unit which deletes the time stamp from each fixed length packet reproduced from the recording medium, and outputs the fixed length packets including the digital compressed audio signal, video signal, and clock reference signal to a decoder for decompressing the digital compressed audio signal and video signal in accordance with the time stamp added to each fixed length packet based on the value counted by the counter.

2. A digital signal reproducing method for reproducing a compressed digital signal from a recording medium, comprising:
reproducing a digitally packetized signal including a digital compressed audio signal, video signal, and clock reference signal from the recording medium, the digitally packetized signal being in a form of fixed length packets, each fixed length packet being form by adding a time stamp indicating an output timing of the fixed length packet;
counting a value by a reference clock;
deleting the time stamp from each fixed length packet reproduced from the recording medium; and outputting the fixed length packet including the digital compressed audio signal, video signal, and clock reference signal to a decoder for decompressing the digital compressed audio signal and video signal in accordance with the time stamp added to each fixed length packet based on the value counted by the reference clock.

* * * * *